US012693266B2

(12) United States Patent
Rasmussen et al.

(10) Patent No.: US 12,693,266 B2
(45) Date of Patent: Jul. 28, 2026

(54) HIGH-TEMPERATURE AND HIGH-PRESSURE SPEED OF SOUND APPARATUS AND MEASURING THE SPEED OF SOUND IN A SAMPLE AT HIGH-TEMPERATURE AND HIGH-PRESSURE

(71) Applicant: Government of the United States of America, as represented by the Secretary of Commerce, Gaithersburg, MD (US)

(72) Inventors: Elizabeth Grace Rasmussen, Boulder, CO (US); Mark Owen McLinden, Boulder, CO (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 399 days.

(21) Appl. No.: 18/482,243

(22) Filed: Oct. 6, 2023

(65) Prior Publication Data
US 2024/0118243 A1 Apr. 11, 2024

Related U.S. Application Data

(60) Provisional application No. 63/413,859, filed on Oct. 6, 2022.

(51) Int. Cl.
*G01N 29/024* (2006.01)
*G01N 29/22* (2006.01)
*G01N 29/24* (2006.01)

(52) U.S. Cl.
CPC ......... *G01N 29/024* (2013.01); *G01N 29/227* (2013.01); *G01N 29/228* (2013.01);
(Continued)

(58) Field of Classification Search
CPC .. G01N 29/024; G01N 29/227; G01N 29/228; G01N 29/2462; G01N 2291/011; G01N 2291/0252; G01N 2291/045
(Continued)

(56) References Cited

U.S. PATENT DOCUMENTS 4,261,197 A * 4/1981 Mansfield ............ G01N 29/228
73/61.79
4,770,699 A * 9/1988 Mountford ......... G01N 33/2025
75/708
(Continued)

OTHER PUBLICATIONS

Dubberke, Frithjof H, et al. "Apparatus for the Measurement of the Speed of Sound of Ammonia up to High Temperatures and Pressures." Review of Scientific Instruments, vol. 85, No. 8, Aug. 1, 2014, pp. 084901-084901, doi.org/10.1063/1.4891795, https://doi.org/10.1063/1.4891795. (Year: 2014).*
(Continued)

*Primary Examiner* — Peter J Macchiarolo
*Assistant Examiner* — Monica S Young
(74) *Attorney, Agent, or Firm* — Office of Chief Counsel for National Institute of Standards and Technology

(57) ABSTRACT

A high-temperature and high-pressure speed of sound apparatus measures the speed of sound in a sample at high-temperature and high-pressure, the apparatus includes: a defined-length spacer that has a fixed length spacer portion; an acoustic reflector, such that a crucible is interposed between the acoustic reflector and a pressure vessel, the pressure vessel in which is disposed the crucible, the disposed defined-length spacer, the sample, an acoustic reflector, and an acoustic rod; and the acoustic rod on which is disposed an ultrasonic transducer.

21 Claims, 9 Drawing Sheets

(52) U.S. Cl.
 CPC ... *G01N 29/2462* (2013.01); *G01N 2291/011*
  (2013.01); *G01N 2291/0252* (2013.01); *G01N*
    *2291/045* (2013.01)

(58) Field of Classification Search
 USPC ......................................................... 73/597
 See application file for complete search history.

(56)      References Cited

U.S. PATENT DOCUMENTS

| | | | | |
|---|---|---|---|---|
| 4,783,997 A | * | 11/1988 | Lynnworth | ............... B06B 3/00 |
| | | | | 73/644 |
| 5,159,838 A | * | 11/1992 | Lynnworth | ............... B06B 3/00 |
| | | | | 73/644 |

OTHER PUBLICATIONS

Kleppa, O.J., "Ultrasonic Velocities of Sound in Some Metallic Liquids. Adiabatic and Isothermal Compressibilities of Liquid Metals at Their Melting Points", The Journal of Chemical Physics, 1950, p. 1331-1336, vol. 18 No. 10.

Greenberg, Y., et al., "High precision measurements of the temperature dependence of the sound velocity in selected liquid metals", Journal of Non-Crystalline Solids, 2008, p. 4094-4100, vol. 354.

Yoshimoto, N., et al., "Sound Velocity Measurements of Molten Germanium", Japanese Journal of Applied Physics, 1996, p. 2754-2757, vol. 35.

Hayashi, M., et al., "Temperature Dependence of the Velocity of Sound in Liquid Metals of Group XIV", International Journal of Thermophysics, 2007, p. 83-96, vol. 28 No. 1.

Al, Y., et al., "An ultrasonic frequency sweep interferometer for liquids at high temperature: 2. Mechanical assembly, signal processing, and application", Journal of Geophysical Research, 2004, p. B12204, vol. 109.

Song, W., et al., "Note: Measurement method for sound velocity of melts in large vol. press and its application to liquid sodium up to 2.0 GPa", Review of Scientific Instruments, 2011, p. 086108, vol. 82.

* cited by examiner (A) 201

(B) 201

207
Ultrasonic Transducer

231
Pressure Vessel Taper Seal Connection

206
Acoustic Rods

217
Pressure Vessel Connector

209
Taper Seals

205
Pressure Vessel

208
Pressure Vessel Cap

201
Spacer

Crucible
204

Reflector
202

HIGH-TEMPERATURE AND HIGH-PRESSURE SPEED OF SOUND APPARATUS AND MEASURING THE SPEED OF SOUND IN A SAMPLE AT HIGH-TEMPERATURE AND HIGH-PRESSURE

CROSS REFERENCE TO RELATED APPLICATIONS

This application claims the benefit of U.S. Provisional Patent Application Ser. No. 63/413,859 (filed Oct. 6, 2022), which is herein incorporated by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in this invention.

BRIEF DESCRIPTION

Disclosed is a high-temperature and high-pressure speed of sound apparatus for measuring the speed of sound in a sample at high-temperature and high-pressure, the high-temperature and high-pressure speed of sound apparatus comprising: a defined-length spacer disposed in a crucible in a pressure vessel and on which is disposed an acoustic reflector and an acoustic rod and that is in mechanical communication with the acoustic rod and the crucible and that comprises a fixed length spacer portion and that receives the sample, receives the acoustic rod, and receives the acoustic reflector, such that the crucible is interposed between the defined-length spacer and the pressure vessel, the acoustic rod is fixedly spaced apart from the acoustic reflector by the fixed length spacer portion, and the sample is interposed between the defined-length spacer and the acoustic reflector; the acoustic reflector disposed on the pressure vessel, the crucible, and the defined-length spacer and in mechanical communication with the crucible and the defined-length spacer and in ultrasonic communication with the acoustic rod and that receives an excitation acoustic pulse from the acoustic rod via the sample, reflects the excitation acoustic pulse toward the acoustic rod as pulse echoes, and in combination with the acoustic rod repeatedly reflects the pulse echoes through the sample to form a sample acoustic pulse, such that the crucible is interposed between the acoustic reflector and the pressure vessel, and the sample is interposed between the acoustic rod and the acoustic reflector; the pressure vessel in which is disposed the crucible, the defined-length spacer, the sample, the acoustic reflector, and the acoustic rod and that receives the crucible, the defined-length spacer, the sample, the acoustic reflector, and the acoustic rod, mechanically stabilizes the crucible, the defined-length spacer, the acoustic reflector, the sample, and the acoustic rod, and provides high-pressure and high-temperature conditions for the sample during determination of the speed of sound in the sample; and the acoustic rod disposed in the pressure vessel, the defined-length spacer and on which is disposed an ultrasonic transducer and in ultrasonic communication with the acoustic reflector and the ultrasonic transducer and that receives the excitation acoustic pulse from the ultrasonic transducer, communicates the excitation acoustic pulse to the acoustic reflector via the sample, receives the pulse echoes from the acoustic rod via the sample, in combination with the acoustic rod repeatedly reflects the pulse echoes through the sample, converts the pulse echoes to the sample acoustic pulse, and communicates the sample acoustic pulse to the ultrasonic transducer, such that the acoustic rod is interposed between the ultrasonic transducer and the ultrasonic transducer.

Disclosed is a process for measuring the speed of sound in a sample at high-temperature and high-pressure using a high-temperature and high-pressure speed of sound apparatus, the process comprising: providing the high-temperature and high-pressure speed of sound apparatus comprising: a defined-length spacer that is disposed on a pressure vessel and on which is disposed an acoustic reflector, an acoustic rod; is disposed in a crucible; is in mechanical communication with the acoustic rod and the crucible; and comprises a fixed length spacer portion; and receives the acoustic rod, and the acoustic reflector, such that the crucible is interposed between the defined-length spacer and the pressure vessel, and the acoustic rod is fixedly spaced apart from the acoustic reflector by the fixed length spacer portion; an acoustic reflector disposed on the pressure vessel, the crucible, and the defined-length spacer and in mechanical communication with the crucible and the defined-length spacer and in ultrasonic communication with the acoustic rod, such that the crucible is interposed between the acoustic reflector and the pressure vessel, and the sample is interposed between the acoustic rod and the acoustic reflector; the pressure vessel in which is disposed the crucible, the disposed defined-length spacer, the sample, the acoustic reflector, the acoustic rod and that receives the crucible, the defined-length spacer, the sample, the acoustic reflector, and the acoustic rod, and mechanically stabilizes the crucible, the defined-length spacer, the acoustic reflector, the sample, and the acoustic rod; and the acoustic rod disposed in the pressure vessel, the defined-length spacer and on which is disposed an ultrasonic transducer and in ultrasonic communication with the acoustic reflector and the ultrasonic transducer, such that the acoustic rod is interposed between the ultrasonic transducer and the ultrasonic transducer; receiving the sample in the defined-length spacer, such that the sample is interposed between the defined-length spacer and the acoustic reflector in the pressure vessel; subjecting the sample to high-pressure and high-temperature in pressure vessel; communicating an excitation acoustic pulse from the ultrasonic transducer to the acoustic rod; receiving, by the acoustic rod, the excitation acoustic pulse; communicating the excitation acoustic pulse from the acoustic rod to the sample; communicating the excitation acoustic pulse through the sample to the acoustic reflector; receiving, by the acoustic reflector, the excitation acoustic pulse from the sample; reflecting, by the acoustic reflector, the excitation acoustic pulse towards the acoustic rod through the sample as pulse echoes; repeatedly reflecting, by the acoustic reflector in combination with the acoustic rod, the pulse echoes through the sample to form a sample acoustic pulse; receiving, by the acoustic rod, the pulse echoes; converting the pulse echoes to a sample acoustic pulse; communicating the sample acoustic pulse to the ultrasonic transducer; and determining the speed of sound of the sample from the sample acoustic pulse.

BRIEF DESCRIPTION OF THE DRAWINGS

The following description cannot be considered limiting in any way. Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
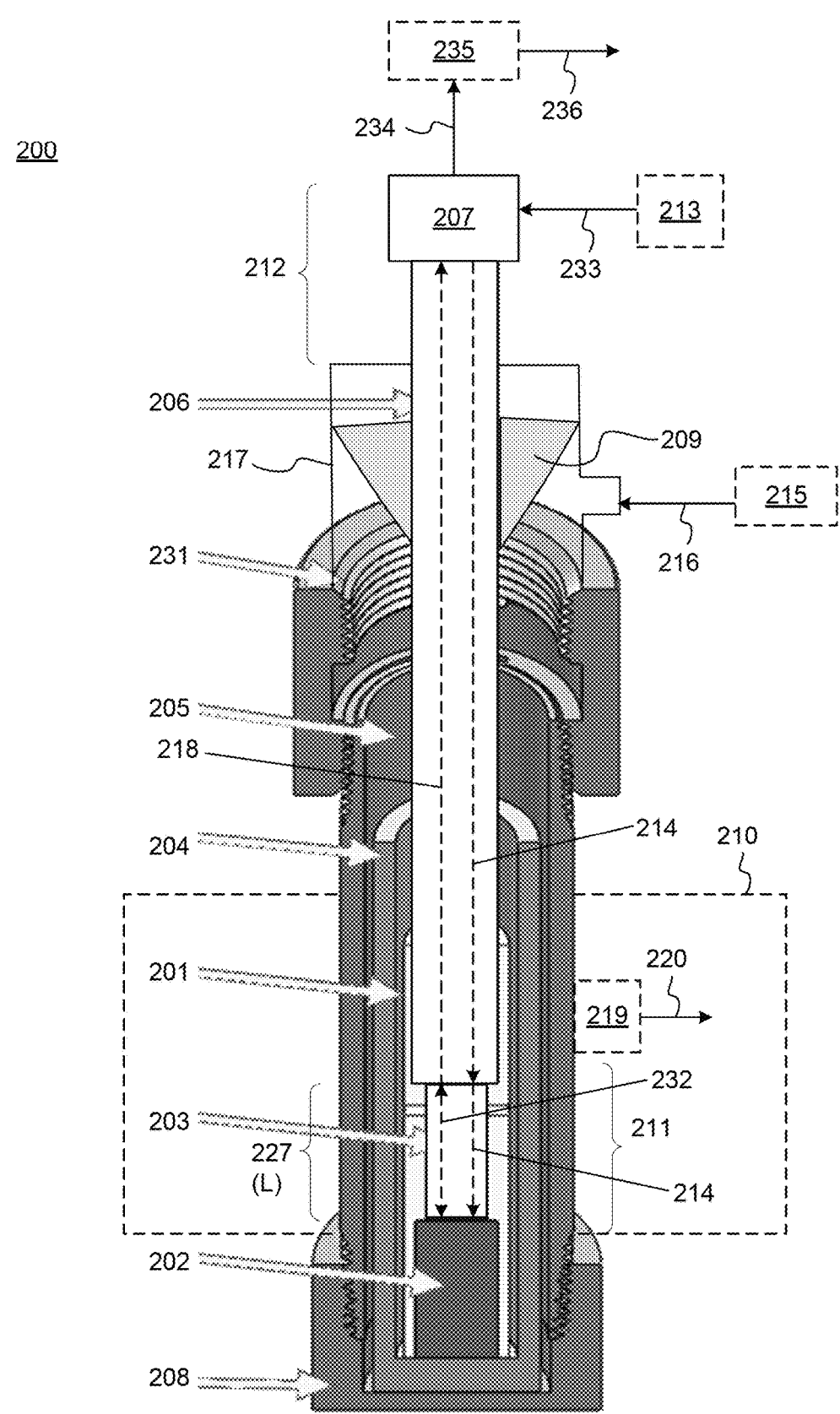
FIG. 1 shows, according to some embodiments, a high-temperature and high-pressure speed of sound apparatus.
Figure 2:
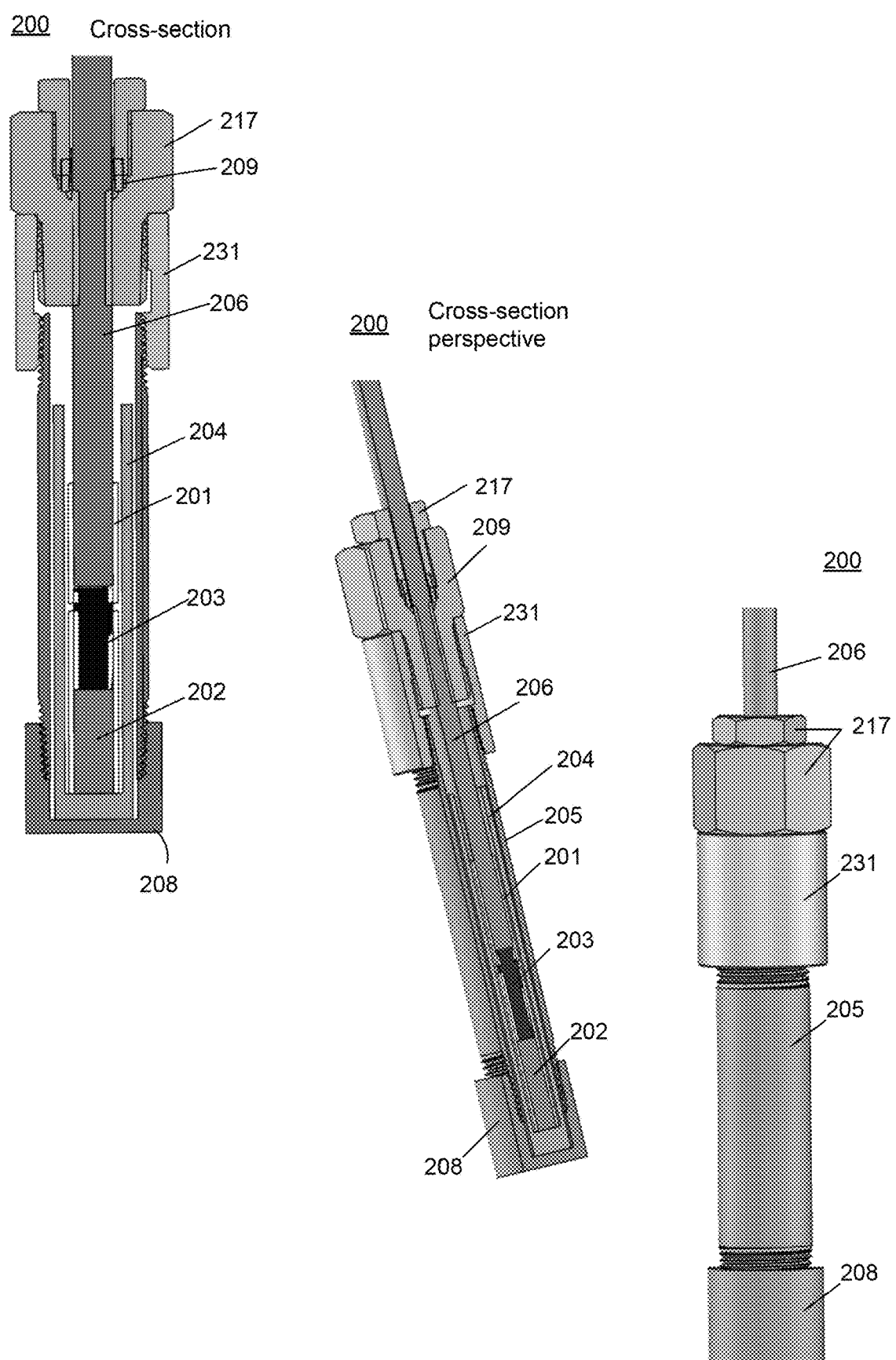
FIG. 2 shows, according to some embodiments, a high-temperature and high-pressure speed of sound apparatus.

A detailed description of one or more embodiments is presented herein by way of exemplification and not limitation.

A gap in thermophysical property data exists for certain metals. This gap impacts additive manufacturing innovation and optimization. A high-temperature and high-pressure speed of sound apparatus described herein accurately measures the speed-of-sound (SoS) of liquid metals and produces reference data, inter alia, for pure metals. From SoS reference data, various properties can be derived for models that predict material behavior.

It has been discovered that a high-temperature and high-pressure speed of sound apparatus measures the speed of sound in a sample at high temperatures and pressures. This information can be used to study the properties of materials under extreme conditions, such as those found in the Earth's interior or in the atmosphere of other planets. The high-temperature and high-pressure speed of sound apparatus generates an acoustic pulse in the sample and then measures the time it takes for the pulse to travel a known distance. The speed of sound is then calculated by dividing the distance by the time.

Conventional technology for determining the speed of sound has a number of technical problems that are overcome by high-temperature and high-pressure speed of sound apparatus 200. Conventional technology cannot operate under both high temperature and high pressure. High-temperature and high-pressure speed of sound apparatus 200 overcomes this problem by providing a controlled environment in which high-temperature and high-pressure can be achieved simultaneously. Conventional technology can be dangerous to operate. High-temperature and high-pressure speed of sound apparatus 200 can overcome this problem by being safer to operate than conventional technology because it uses a more controlled environment.

High-temperature and high-pressure speed of sound apparatus 200 measures the speed of sound in a sample at high-temperature and high-pressure. In an embodiment, with reference to FIG. 1, FIG. 2, FIG. 3, FIG. 4, FIG. 5, FIG. 6, FIG. 8, and FIG. 9, high-temperature and high-pressure speed of sound apparatus 200 includes: a defined-length spacer 201 disposed in a crucible 204 in a pressure vessel 205 and on which is disposed an acoustic reflector 202 and an acoustic rod 206 and that is in mechanical communication with the acoustic rod 206 and the crucible 204 and that comprises a fixed length spacer portion 227 and that receives the sample 203, receives the acoustic rod 206, and receives the acoustic reflector 202, such that the crucible 204 is interposed between the defined-length spacer 201 and the pressure vessel 205, the acoustic rod 206 is fixedly spaced apart from the acoustic reflector 202 by the fixed length spacer portion 227, and the sample 203 is interposed between the defined-length spacer 201 and the acoustic reflector 202; the acoustic reflector 202 disposed on the pressure vessel 205, the crucible 204, and the defined-length spacer 201 and in mechanical communication with the crucible 204 and the defined-length spacer 201 and in ultrasonic communication with the acoustic rod 206 and that receives an excitation acoustic pulse 214 from the acoustic rod 206 via the sample 203, reflects the excitation acoustic pulse 214 toward the acoustic rod 206 as pulse echoes 232, and in combination with the acoustic rod 206 repeatedly reflects the pulse echoes 232 through the sample 203 to form a sample acoustic pulse 218, such that the crucible 204 is interposed between the acoustic reflector 202 and the pressure vessel 205, and the sample 203 is interposed between the acoustic rod 206 and the acoustic reflector 202; the pressure vessel 205 in which is disposed the crucible 204, the defined-length spacer 201, the sample 203, the acoustic reflector 202, and the acoustic rod 206 and that receives the crucible 204, the defined-length spacer 201, the sample 203, the acoustic reflector 202, and the acoustic rod 206, mechanically stabilizes the crucible 204, the defined-length spacer 201, the acoustic reflector 202, the sample 203, and the acoustic rod 206, and provides high-pressure and high-temperature conditions for the sample 203 during determination of the speed of sound in the sample 203; and the acoustic rod 206 disposed in the pressure vessel 205, the defined-length spacer 201 and on which is disposed an ultrasonic transducer 207 and in ultrasonic communication with the acoustic reflector 202 and the ultrasonic transducer 207 and that receives the excitation acoustic pulse 214 from the ultrasonic transducer 207, communicates the excitation acoustic pulse 214 to the acoustic reflector 202 via the sample 203, receives the pulse echoes 232 from the acoustic rod 206 via the sample 203, in combination with the acoustic rod 206 repeatedly reflects the pulse echoes 232 through the sample 203, converts the pulse echoes 232 to the sample acoustic pulse 218, and communicates the sample acoustic pulse 218 to the ultrasonic transducer 207, such that the acoustic rod 206 is interposed between the ultrasonic transducer 207 and the ultrasonic transducer 207.

In an embodiment, high-temperature and high-pressure speed of sound apparatus 200 includes sample 203 disposed in defined-length spacer 201 and interposed between acoustic rod 206 and acoustic reflector 202 and that communicates excitation acoustic pulse 214 and pulse echoes 232 between acoustic rod 206 and acoustic reflector 202, such that sample 203 is arranged within heating zone 211 of defined-length spacer 201, and sample 203 is subjected to heating to the high-temperature and pressurization to the high-pressure.

In an embodiment, high-temperature and high-pressure speed of sound apparatus 200 includes crucible 204 disposed in pressure vessel 205 and on which is disposed defined-length spacer 201 and that receives defined-length spacer 201, acoustic reflector 202, sample 203, and acoustic rod 206, mechanically stabilizes defined-length spacer 201, acoustic reflector 202, sample 203, and acoustic rod 206 within pressure vessel 205, and provides thermal communication from pressure vessel 205 to sample 203.

In an embodiment, high-temperature and high-pressure speed of sound apparatus 200 includes ultrasonic transducer 207 disposed on acoustic rod 206 and in ultrasonic communication with acoustic rod 206 and sample 203 and that produces excitation acoustic pulse 214, communicates excitation acoustic pulse 214 to acoustic rod 206, receives sample acoustic pulse 218 from acoustic rod 206, and produces output pulse 234 from sample acoustic pulse 218.

In an embodiment, high-temperature and high-pressure speed of sound apparatus 200 includes vessel cap 208 disposed on pressure vessel 205 and in mechanical communication with pressure vessel 205 and that provides a leak-proof seal in combination with pressure vessel 205 so that gases and liquids are maintained in pressure vessel 205.

In an embodiment, high-temperature and high-pressure speed of sound apparatus 200 includes seal 209 disposed on pressure vessel connector 231, seal connection 217, and acoustic rod 206 and in mechanical communication with pressure vessel connector 231, seal connection 217, and acoustic rod 206 and that seats in pressure vessel connector 231, receives a compressive force from pressure vessel connector 231 and seal connection 217, mechanically engages acoustic rod 206 in response to the compressive force, and forms a leak-proof seal between pressure vessel connector 231 and acoustic rod 206 that maintains the high-pressure of pressurization gas 216 in pressure vessel 205 under high-temperature conditions.

In an embodiment, high-temperature and high-pressure speed of sound apparatus 200 includes heater 210 in communication with pressure vessel 205, heating zone 211, and sample 203 and that produces heat that is communicated to sample 203 in heating zone 211 via pressure vessel 205 that heats sample 203.

In an embodiment, high-temperature and high-pressure speed of sound apparatus 200 includes heating zone 211 arranged along pressure vessel 205 where sample 203 is received by defined-length spacer 201, receives heat from heater 210 and communicates the heat to sample 203; and temperate zone 212 arranged along acoustic rod 206 and ultrasonic transducer 207 outside of heating zone 211 so that ultrasonic transducer 207 is not subjected to the high-temperature and avoids thermal malfunction of ultrasonic transducer 207.

In an embodiment, high-temperature and high-pressure speed of sound apparatus 200 includes pulser source 213 in electrical communication with ultrasonic transducer 207 and that produces input pulse 233, communicates input pulse 233 to ultrasonic transducer 207, and controls production of excitation acoustic pulse 214 by ultrasonic transducer 207 by input pulse 233.

In an embodiment, high-temperature and high-pressure speed of sound apparatus 200 includes gas source 215 in fluid communication with pressure vessel 205 and that provides pressurization gas 216 to pressure vessel 205 and pressurizes pressure vessel 205 with pressurization gas 216.

In an embodiment, high-temperature and high-pressure speed of sound apparatus 200 includes seal connection 217 disposed on pressure vessel connector 231 and in mechanical communication with pressure vessel connector 231 and seal 209 and that mechanically engages pressure vessel connector 231 and seal 209, produces a compressive force in combination with pressure vessel connector 231, communicates the compressive force to seal 209, and forms a leak-proof seal between pressure vessel connector 231 and acoustic rod 206 with seal 209 that maintains the high-pressure of pressurization gas 216 in pressure vessel 205 under high-temperature conditions; and pressure vessel connector 231 disposed on seal connection 217 and in mechanical communication with seal connection 217 and that mechanically engages seal connection 217 and seals pressure vessel 205 in combination with pressure vessel connector 231.

In an embodiment, high-temperature and high-pressure speed of sound apparatus 200 includes temperature sensor 219 disposed on pressure vessel 205 and in communication with pressure vessel 205 and that monitors the temperature of sample 203 in heating zone 211 and produces temperature signal 220 that indicates the temperature of sample 203 in defined-length spacer 201.

In an embodiment, defined-length spacer 201 of high-temperature and high-pressure speed of sound apparatus 200 includes: an acoustic reflector receiver 221 disposed in the crucible 204 and that comprises an acoustic reflector receiver wall 223 and an acoustic reflector receiver step 222 and that receives the acoustic reflector 202, such that the acoustic reflector 202 is disposed on the acoustic reflector receiver step 222; the acoustic reflector receiver step 222 disposed on the crucible 204 and in mechanical communication with the crucible 204 and that opposes the crucible 204 and mechanically engages a reflector contact surface 237 of the acoustic reflector 202, such that a crucible contact surface 238 of the acoustic reflector 202 mechanically engages the crucible 204, and the acoustic reflector 202 is interposed between the acoustic reflector receiver step 222 and the crucible 204; the acoustic reflector receiver wall 223 that provides an interior boundary of the defined-length spacer 201 for receipt of the acoustic reflector 202 in the acoustic reflector receiver 221; a sample receiver 224 that comprises a sample receiver wall 225 and an effluent aperture 226 and receives the sample 203, such that the sample 203 is disposed on the reflector contact surface 237 of the acoustic reflector 202; the sample receiver wall 225 that provides an interior boundary of the defined-length spacer 201 for receipt of the sample 203 in the sample receiver 224; the effluent aperture 226 in fluid communication with the sample 203 and the sample receiver wall 225 and that communicates a pressurization gas 216 between the pressure vessel 205 and the sample 203 in the defined-length spacer 201, communicates off-gas from the sample 203 to the pressure vessel 205, and provides flow communication for evacuation and pressurization of the defined-length spacer 201 at the same pressure as the internal volume of the pressure vessel 205 external to the defined-length spacer 201; the fixed length spacer portion 227 that fixes the distance between the acoustic rod receiver step 228 of the acoustic rod receiver 230 and the acoustic reflector receiver step 222 of the acoustic reflector receiver 221 over which the excitation acoustic pulse 214 is communicated through the sample 203 from the acoustic rod 206 to the acoustic reflector 202 and over which the pulse echoes 232 are repeatedly reflected between the acoustic rod 206 and the acoustic reflector 202; an acoustic rod receiver step 228 that opposes the ultrasonic transducer 207 and mechanically engages a sample contact surface 239 of the acoustic rod 206, such that the acoustic rod 206 is interposed between the ultrasonic transducer 207 and the acoustic rod receiver step 228, and the sample contact surface 239 of the acoustic rod 206 is fixedly spaced apart from the reflector contact surface 237 of the acoustic reflector 202 by the fixed length spacer portion 227; an acoustic rod receiver wall 229 that provides an interior boundary of an acoustic rod receiver 230 of the defined-length spacer 201 for receipt of the acoustic rod 206 in the acoustic rod receiver 230; and the acoustic rod receiver 230 that comprises the acoustic rod receiver step 228 and the acoustic rod receiver wall 229 and receives the acoustic rod 206, such that the acoustic rod 206 is disposed on the acoustic rod receiver step 228 of the acoustic rod receiver 230.

In an embodiment, high-temperature and high-pressure speed of sound apparatus 200 includes acoustic analyzer 235 in electrical communication with 207 and that receives output pulse 234 from ultrasonic transducer 207, analyzes output pulse 234, and produces speed of sound 236 of sample 203.

High-temperature and high-pressure speed of sound apparatus 200 can operate at a pressure from $1*10^{-7}$ MPa to 400 MPa; or temperature from −40 to 2000° C. No conventional instrument or technique can obtain such data. Advantageously, high-temperature and high-pressure speed of sound apparatus 200 includes high-temperature and high-pressure speed of sound apparatus 200 of known length that defines the path length of sample 203 and provides a level of accuracy for sound speed measurements not obtained by conventional methods.

High-temperature and high-pressure speed of sound apparatus 200 can be made of various elements and components that can be assembled together or fabricated. Elements of high-temperature and high-pressure speed of sound apparatus 200 can be various sizes and shapes. Elements of high-temperature and high-pressure speed of sound apparatus 200 can be made of a material that is physically or chemically resilient in an environment in which high-temperature and high-pressure speed of sound apparatus 200 is disposed. Exemplary materials include a metal, ceramic, glass, semiconductor, and the like. The elements of high-temperature and high-pressure speed of sound apparatus 200 can be made of the same or different material and can be monolithic in a single physical body or can be separate members that are physically joined. The operating parameters of the high-temperature and high-pressure speed of sound apparatus can be determined by the desired high temperature and high pressure for the sample. The temperature can be controlled by a variety of methods, such as a resistance heater, a resistive furnace, or a laser. The pressure can be controlled by a variety of methods, such as a gas compressor, a liquid piston, or a mechanical pump. The operating parameters of the high-temperature and high-pressure speed of sound apparatus are also determined by the desired accuracy of the measurement. The accuracy of the measurement is affected by a number of factors, such as the temperature stability of the pressure vessel, the acoustic impedance of the defined-length spacer, and the sensitivity of the acoustic transducers. In some embodiments, materials such as metals or ceramics are selected to provide suitable acoustic impedance, e.g., from 0.1 MRay to 150 MRay so that pulse echoes 232 are optimally produced and communicated through sample 203.

Defined-length spacer 201 of high-temperature and high-pressure speed of sound apparatus 200 is a rigid member that is disposed between acoustic reflector 202 and acoustic rod 206. It serves to define the length of the acoustic path between the acoustic reflector and the acoustic rod, and to ensure that the acoustic pulse travels through sample 203 in a straight line. Defined-length spacer 201 can be made of a material that is hard, chemically inert, and has high thermal conductivity such as alumina, sapphire, diamond, or silicon carbide, and the material can be selected to withstand high temperatures such as that involved in melting refractory metals and the like. Defined-length spacer 201 can be a cylindrical rod with an appropriately sized inner diameter for receipt of sample 203. Defined-length spacer 201 is rigid to maintain the acoustic path between the acoustic reflector and the acoustic rod. It is recognized that deflection of defined-length spacer 201 can result in a change in the acoustic path length, which will in turn affect the measurement of the speed of sound. Defined-length spacer 201 can be non-porous to prevent sample 203 from diffusing into defined-length spacer 201, which could lead to erroneous results. Defined-length spacer 201 can be acoustically transmissive to allow the acoustic pulse to travel through sample 203 in a straight line. It is recognized that absorption or scattering of the acoustic pulse by defined-length spacer 201 could affect the measurement of the speed of sound. Defined-length spacer 201 can have high thermal conductivity to communicate heat to sample 203 from heater 210. It is contemplated that fixed length spacer portion 227 of defined-length spacer 201 can have a known length between 1 mm and 1,000 mm that provides the path length of defined-length spacer 201 and can provide from 0.01 to 10 percent uncertainty for a high-accuracy measurement of speed of sound 236 that is not achievable by conventional technology.

Figure 3:
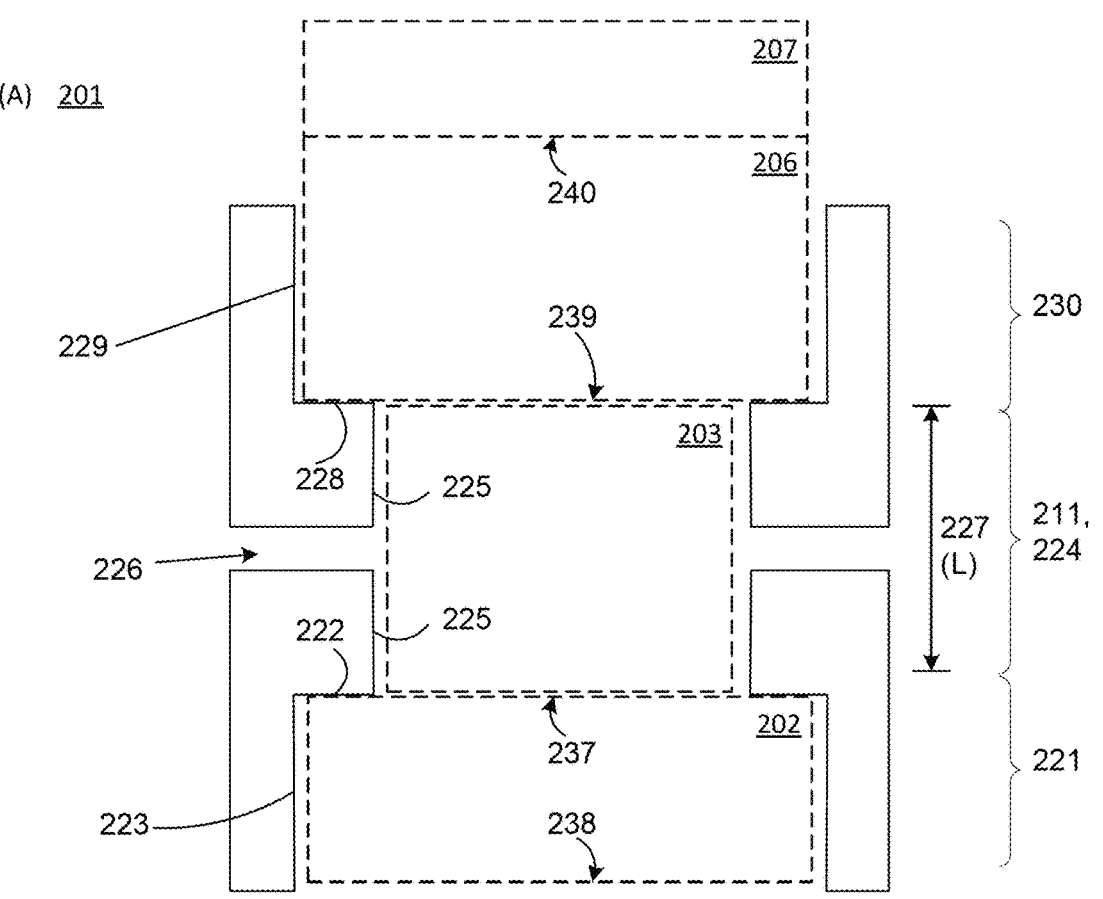
FIG. 3 shows, according to some embodiments, a cross-section and a perspective cross-section of a defined-length spacer.
Figure 3:
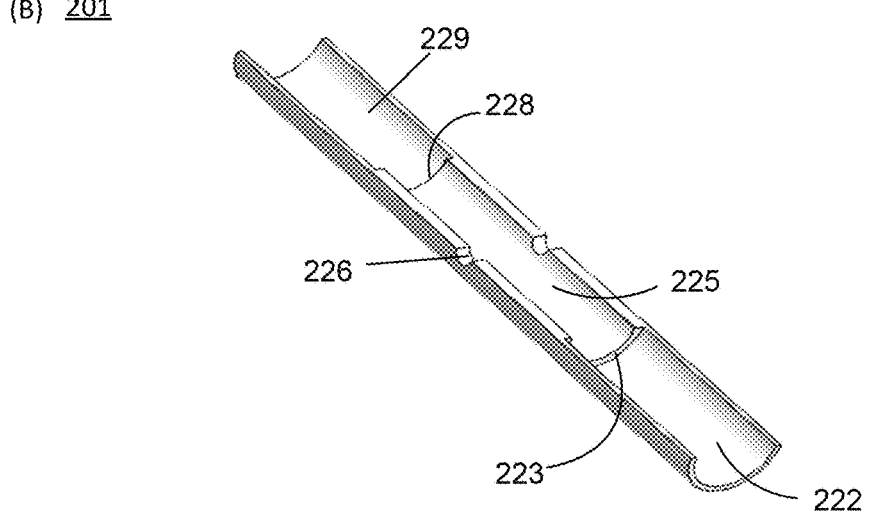
Figure 4:
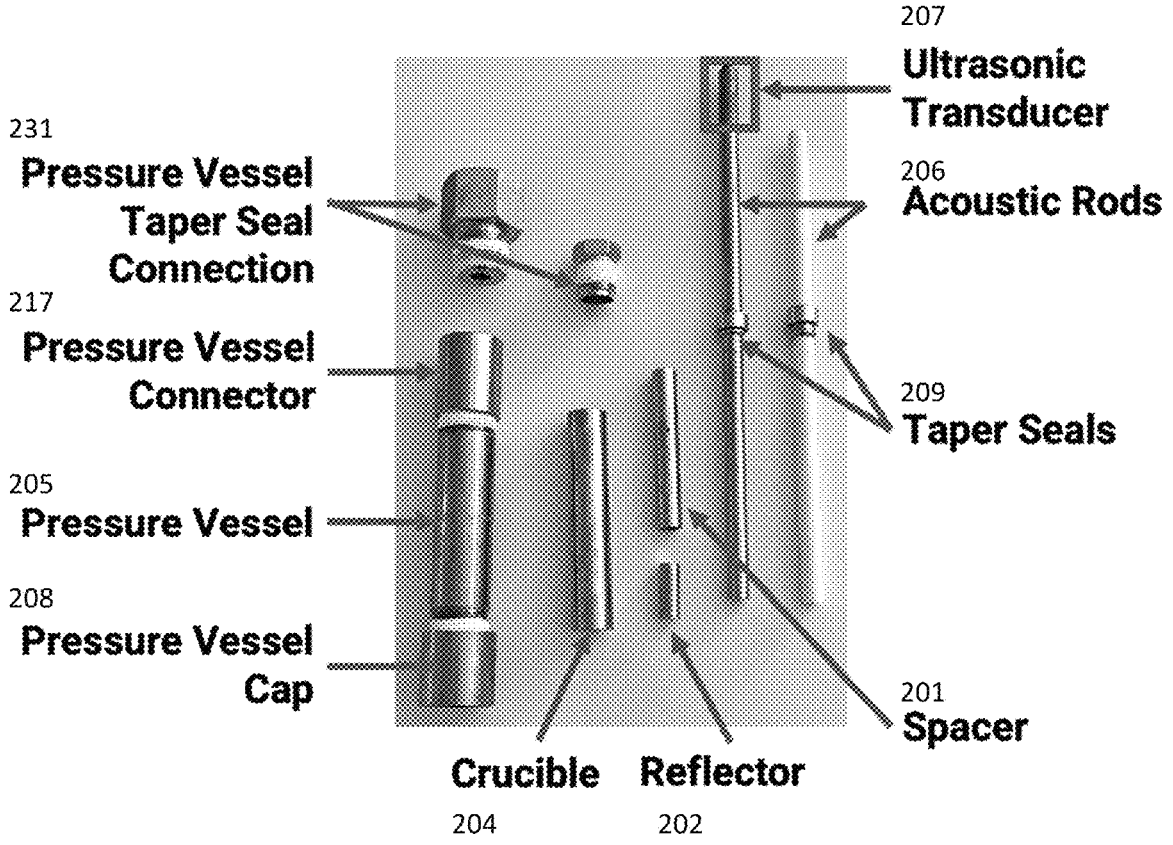
FIG. 4 shows, according to some embodiments, components of a high-temperature and high-pressure speed of sound apparatus.
Figure 5:
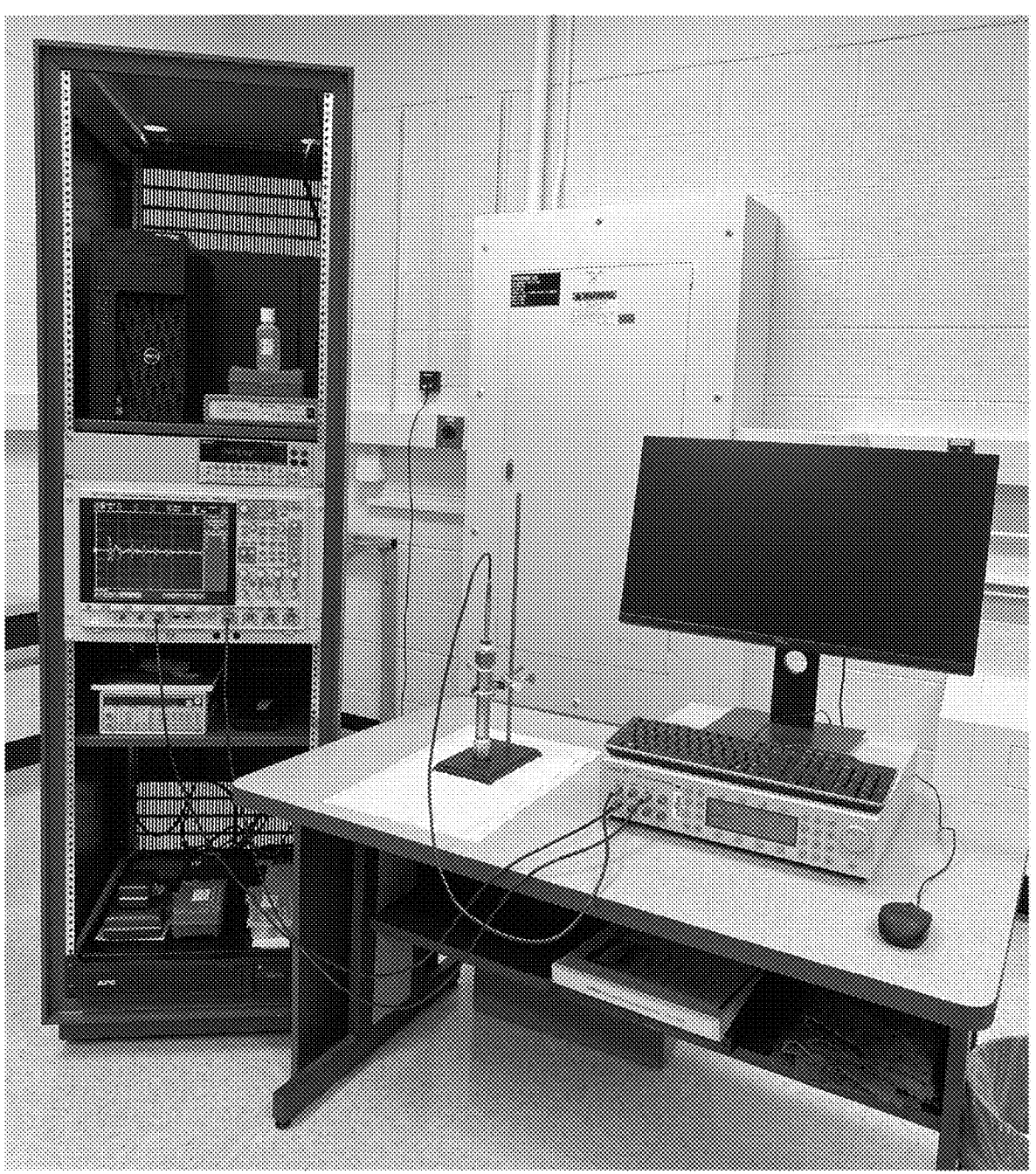
FIG. 5 shows, according to some embodiments, a high-temperature and high-pressure speed of sound apparatus.

Defined-length spacer 201 includes several components for interfacing with pressure vessel 205, acoustic rod 206, sample 203, and acoustic reflector 202 as shown in FIG. 3. Acoustic reflector receiver 221 is a recessed portion of defined-length spacer 201 that receives acoustic reflector 202 and includes acoustic reflector receiver step 222 and acoustic reflector receiver wall 223 that mechanically stabilize acoustic reflector 202 with other components of high-temperature and high-pressure speed of sound apparatus 200. Acoustic reflector receiver 221 is in mechanical and fluid communication with sample receiver 224. Sample receiver 224 includes sample receiver wall 225 and effluent aperture 226. Sample receiver 224 receives sample 203 and is mechanical and fluid communication with acoustic rod receiver 230. Effluent aperture 226 is a small opening in defined-length spacer 201 that places sample receiver 224 in fluid communication with pressure vessel 205 and allows gases to escape into pressure vessel 205. Effluent aperture 226 can be made, e.g., by drilling a hole in defined-length spacer 201. Defined-length spacer 201 also includes fixed length spacer portion 227 that maintain a fixed distance between acoustic reflector 202 and acoustic rod 206, which is used for accurate measurements of the speed of sound in sample 203. Acoustic rod receiver 230 includes acoustic rod receiver step 228 and acoustic rod receiver wall 229 that mechanically engage acoustic rod 206 and physically obstruct acoustic rod 206 from contacting acoustic reflector 202 in combination with acoustic reflector receiver step 222.

Acoustic reflector 202 reflects excitation acoustic pulse 214 toward sample 203 and acoustic rod 206 and repeatedly reflects pulse echoes 232 through sample 203 to form sample acoustic pulse 218 in acoustic rod 206. Acoustic reflector 202 can be made of a material that is highly reflective of acoustic waves, such as a metal or a ceramic. The material should also be resistant to high temperatures and pressures, as it will be exposed to these conditions in high-temperature and high-pressure speed of sound apparatus 200. An exemplary material is tungsten. Acoustic reflector 202 can have a planar surface. The shape of acoustic reflector 202 can affect the way in which the acoustic waves are reflected, and it can be optimized to achieve the desired results. Acoustic reflector 202 can be disposed in pressure vessel 205 and arranged in ultrasonic communication with acoustic rod 206. The distance between acoustic reflector 202 and acoustic rod 206 can be set by defined-length spacer 201 and adjusted to optimize the performance of the apparatus. Acoustic reflector 202 can be operated at high temperatures and pressures. The temperature of acoustic reflector 202 can range from room temperature to 2000° C., and the pressure of acoustic reflector 202 can range from atmospheric pressure to several tens of mega Pascals. Acoustic reflector 202 can be operated in a vacuum or an inert atmosphere as well as in presence of a molten metal or salt.

Crucible 204 of high-temperature and high-pressure speed of sound apparatus 200 can be a refractory container that is used to contain sample 203. Crucible 204 can be made of a material that is resistant to high temperatures and pressures, such as a metal alloy, ceramic, or carbon. Crucible 204 can have a selected length that provides for full containment of sample 203 in defined-length spacer 201 as well as a complete length of defined-length spacer 201. Crucible 204 is also in mechanical communication with acoustic rod 206 and defined-length spacer 201 and receives both and can ensure that the acoustic pulse 214 travels in a straight line through sample 203. In some embodiments, crucible 204 is non-porous.

Pressure vessel 205 is a hermetically sealed container that provides a controlled environment for sample 203. Pressure vessel 205 is made of a strong, corrosion-resistant material, such as stainless steel or titanium. Pressure vessel 205 can be cylindrical in shape, with a selected diameter of 1-50 cm and a height. Pressure vessel 205 can be equipped with a pressure gauge, a temperature gauge, and a valve for filling and emptying the vessel. The temperature of pressure vessel 205 can be controlled by a heater or a cooler. The pressure in pressure vessel 205 can be controlled by a regulator. Sample 203 is placed in pressure vessel 205 in defined-length spacer 201 that provides a fixed distance between acoustic reflector 202 and acoustic rod 206. Pressure vessel 205 can be used to measure the speed of sound in solid and molten samples at temperatures, e.g., up to 2,000° C. and pressures, e.g., up to 400 MPa.

Acoustic rod 206 is a waveguide for communicating sonic pulses (excitation acoustic pulse 214, sample acoustic pulse 218) and can be a cylindrical rod made of a material that is transmissive to sound waves. The rod can be made of a material such as alumina, fused silica, sapphire, diamond, or a high-temperature metal or alloy, such as tungsten or molybdenum. The rod has a length that can be equal to or greater than the diameter of sample 203. The rod is disposed in pressure vessel 205 and is in ultrasonic communication with acoustic reflector 202. The rod receives excitation acoustic pulse 214 from ultrasonic transducer 207 and communicates excitation acoustic pulse 214 to acoustic reflector 202 via sample 203. The rod also receives pulse echoes 232 from acoustic reflector 202 via sample 203 and in combination with acoustic reflector 202 repeatedly reflects pulse echoes 232 through sample 203 to form sample acoustic pulse 218. Sample acoustic pulse 218 is communicated to ultrasonic transducer 207 from acoustic rod 206. The physical properties of acoustic rod 206 include its length, diameter, and material composition.

Ultrasonic transducer 207 is a piezoelectric device that converts electrical energy, e.g., input pulse 233, into acoustic energy in the form of an ultrasonic wave, e.g., excitation acoustic pulse 214. The ultrasonic wave is then transmitted through sample 203 and reflected back to ultrasonic transducer 207 by acoustic reflector 202 as pulse echoes 232, which are communicated through acoustic rod 206 and sample acoustic pulse 218. Ultrasonic transducer 207 then converts sample acoustic pulse 218 into electrical energy as output pulse 234, which is measured by acoustic analyzer 235. The speed of sound in sample 203 can then be calculated from the time delay between subsequent sample acoustic pulses 218. Ultrasonic transducer 207 can generate ultrasonic waves with a selected amplitude and selected bandwidth. Because ultrasonic transducer 207 is separated from sample 203 and heating zone 211, ultrasonic transducer 207 is not subjected to the high temperatures and pressures that are present in pressure vessel 205. Ultrasonic transducer 207 can be made of a piezoelectric material, such as quartz or lead zirconate titanate (PZT). The piezoelectric material can be sandwiched between two metal electrodes, and when an electrical voltage is applied to the electrodes, the piezoelectric material generates excitation acoustic pulse 214. The frequency of the ultrasonic wave can be selectively tailored to measure speed of sound 236 of sample 203. Ultrasonic transducer 207 can be mounted on acoustic rod 206, and acoustic rod 206 is inserted into pressure vessel 205 and defined-length spacer 201 to be in ultrasonic communication with sample 203. Ultrasonic transducer 207 is then excited with input pulse 233, and excitation acoustic pulse 214 is transmitted through sample 203.

Vessel cap 208 is a metal cap that is used to seal pressure vessel 205. It is made of a high-strength, corrosion-resistant metal, such as stainless steel or titanium. The vessel cap has a threaded opening that mate with the threaded opening on the pressure vessel. The vessel cap can be equipped with a pressure relief valve that allows excess pressure to escape from the pressure vessel in the event of a pressure spike and rated to operate a high enough pressure to maintain the high-pressure in pressure vessel 205 for measurement of speed of sound 236 in sample 203 under the high-temperature. The vessel cap can withstand 400 MPa or greater and can withstand 2,000° C. or greater. Various types of vessel caps includes threaded caps and compression caps although brazing or welding or alternatives are contemplated. Threaded caps are secured to the pressure vessel using a threaded connection. Compression caps are secured to the pressure vessel using a compression ring. Compression caps can be used on pressure vessels that are subjected to high vibration or shock.

Pulser source 213 generates input pulse 233 that is communicated to ultrasonic transducer 207. Pulser source 213 can include pulse generator, pulse amplifier, pulse transformer, and the like to produce input pulse 233 so that input pulse 233 is of a sufficient voltage to drive ultrasonic transducer 207.

Excitation acoustic pulse 214 can be a short, high-intensity burst of sound waves that is used to initiate the measurement of the speed of sound in sample 203. The excitation acoustic pulse is generated by ultrasonic transducer 207, which can be a piezoelectric device that converts electrical energy into mechanical energy in the form of sound waves. The ultrasonic transducer can be made of a piezoelectric material such as quartz or lead zirconate titanate (PZT). The excitation acoustic pulse is generated by applying a short, high-voltage pulse to the ultrasonic transducer. The piezoelectric material in the ultrasonic transducer converts the electrical energy into mechanical energy, which is then emitted in the form of sound waves. The excitation acoustic pulse is transmitted through sample 203 by acoustic rod 206.

Sample acoustic pulse 218 is a transient acoustic wave that is generated by acoustic reflector 202 and acoustic rod 206 in high-temperature and high-pressure speed of sound apparatus 200. Sample acoustic pulse 218 is used to measure speed of sound 236 in sample 203. Sample acoustic pulse 218 has a number of physical properties, including amplitude, frequency, duration of the pulse, and the like. Acoustic reflector 202 receives excitation acoustic pulse 214 from ultrasonic transducer 207. Excitation acoustic pulse 214 is a short, high-amplitude pulse that is used to initiate the generation of sample acoustic pulse 218 and pulse echoes 232. Excitation acoustic pulse 214 is reflected off of acoustic reflector 202 and travels through sample 203 and pulse echoes 232. Acoustic rod 206 receives reflected pulse echoes 232 and converts it into sample acoustic pulse 218. Sample acoustic pulse 218 is communicated through acoustic rod 206 to ultrasonic transducer 207, where it is transduced into output pulse 234. The operating parameters of sample acoustic pulse 218 include the pressure and temperature of sample 203. The pressure and temperature of the sample will affect the speed of sound in the sample, which will in turn affect the amplitude, frequency, and duration of sample acoustic pulse 218.

Pulse echoes 232 are acoustic waves that are reflected between acoustic reflector 202 and acoustic rod 206 and communicated through sample 203. They are used to measure speed of sound 236 in sample 203. The physical properties of pulse echoes 232 include their amplitude, frequency, and phase. The range of outputs of pulse echoes 232 is determined by the properties sample 203, which are affected by the pressure and temperature. Pulse echoes 232 can be direct pulse echoes or indirect pulse echoes. Direct pulse echoes are those that are reflected directly from acoustic reflector 202 and converted to sample acoustic pulse 218 by receipt in acoustic rod 206. Indirect pulse echoes are those that are repeatedly reflected between acoustic reflector 202 and acoustic rod 206.

Input pulse 233 is an electrical waveform that is generated by pulser source 213 and is communicated to ultrasonic transducer 207. Ultrasonic transducer 207 then produces excitation acoustic pulse 214 based on control by input pulse 233 and communicates excitation acoustic pulse 214 to acoustic rod 206. Input pulse 233 has a number of physical properties that can be selectively tailored for a given sample 203 and configuration of high-temperature and high-pressure speed of sound apparatus 200, including frequency, amplitude, duty cycle, and duration. Input pulse 233 can be generated in a number of ways, including pulse generation from an arbitrary function generator, a fixed electrical circuit, or digital computing.

Figure 8:
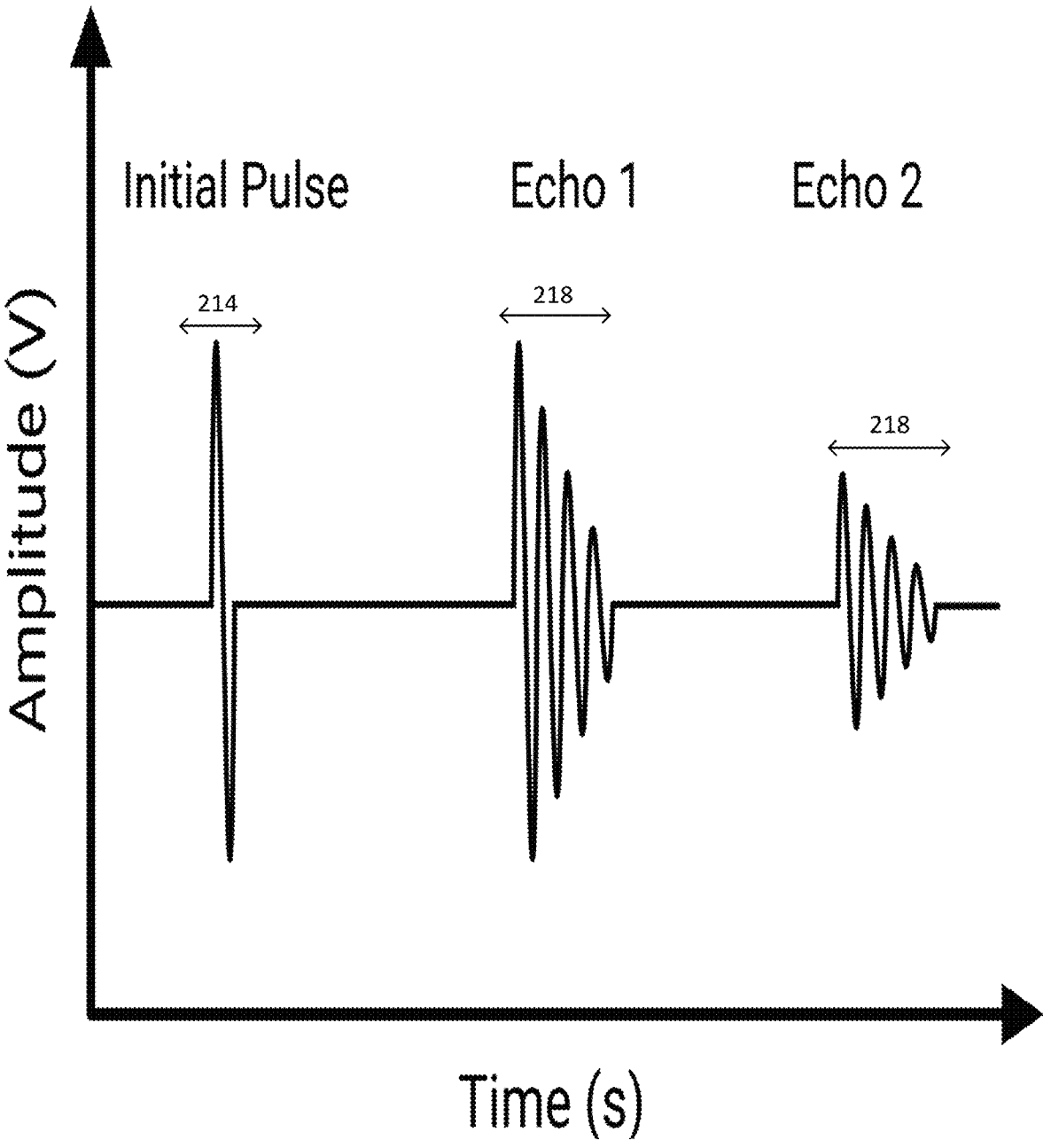
FIG. 8 shows, according to some embodiments, pulse echoes and an excitation acoustic pulse.

Output pulse 234 indicates the speed of sound in sample 203. It is generated by ultrasonic transducer 207 from receipt of sample acoustic pulse 218 from acoustic rod 206, which are in ultrasonic communication with each other. Acoustic rod 206 receives excitation acoustic pulse 214 from ultrasonic transducer 207, which is then communicated to acoustic reflector 202 via sample 203. Acoustic reflector 202 reflects excitation acoustic pulse 214 back toward acoustic rod 206 as pulse echoes 232. Acoustic rod 206 receives pulse echoes 232 and communicates them as sample acoustic pulse 218. Sample acoustic pulse 218 is then communicated to ultrasonic transducer 207, which converts sample acoustic pulse 218 to output pulse 234 for determination of the speed of sound in sample 203 by acoustic analyzer 235. Output pulse 234 is a function of the speed of sound in sample 203, the length of sample 203, and the time delay between excitation acoustic pulse 214 and sample acoustic pulse 218. Parameters of output pulse 234 include frequency, amplitude, and the like. Output pulse 234 can have various components such as positive-going peaks or negative-going peaks. Exemplary output pulse 234 is shown in FIG. 8.

Acoustic analyzer 235 receives output pulse 234 from ultrasonic transducer 207 and displays the corresponding waveform or measures the speed of sound in sample 203 at the high-temperature and high-pressure. It can include various components such as a signal processor that analyzes output pulse 234 to determine speed of sound 236 in sample 203. Acoustic analyzer 235 can be an oscilloscope, computer, analog-to-digital-converter, data-acquisition system, and the like.

Pressure vessel connector 231 is a component of high-temperature and high-pressure speed of sound apparatus 200 that connects pressure vessel 205 to seal connection 217. It can be, e.g., a metal alloy (e.g., stainless steel) with a high melting point and a low coefficient of thermal expansion. Pressure vessel connector 231 can have a cylindrical shape with a threaded inner surface and smooth outer surface. The threaded inner surface mates with the threaded outer surface of pressure vessel 205 and the threaded outer surface of seal connection 217. It is contemplated that, instead of being connected via threads, pressure vessel connector 231 can be welded. The materials of construction for pressure vessel connector 231 depend on the specific design of high-temperature and high-pressure speed of sound apparatus 200.

Seal 209 is a metallic seal that is used to prevent the leakage of high-pressure gas from pressure vessel 205. Seal 209 can be made of a high-temperature, high-pressure metal (e.g., pure metal or an alloy) that is resistant to corrosion and wear. Seal 209 can be self-lubricating to prevent it from sticking to pressure vessel 205. Seal 209 can withstand pressures of 400 MPa or greater and can withstand temperatures of 2,000° C. or greater. Seal 209 can withstand repeated cycles of high pressure and temperature. Seal 209 is subjected to a force between seal connection 217 and pressure vessel connector 231 until it is seated against pressure vessel connector 231 of pressure vessel 205 and forms a leak-proof seal against acoustic rod 206. Seal 209 is then held in place by the force of seal connection 217. There are a variety of different types of seals that can be used in high-temperature and high-pressure applications, including metal-to-metal seal. An exemplary seal 209 is a frustoconical shaped annulus that has an outer taper that engages with pressure vessel connector 231, wherein the seal can be a taper seal (commercially available as TAPER SEAL connection from High Pressure Equipment Co., Erie, PA, USA). Seal 209 can be made of a high-temperature, high-pressure alloy such as stainless steel, Inconel, and Hastelloy.

Seal connection 217 is a metallic seal that is used to connect pressure vessel 205 to defined-length spacer 201 and can be made of a high-temperature and high-pressure-resistant material, such as stainless steel or Inconel. Seal connection 217 can have a cylindrical shape with a threaded inner or outer surface. Such surface of seal connection 217 is threaded to mate with the threads on pressure vessel 205 or pressure vessel connector 231. A thin layer of sealant can be applied to the threads of seal connection 217, which is tightened until the threaded connection is snug.

Heater 210 heats pressure vessel 205 to a desired temperature. Heater 210 can be made of a metal alloy that has a high melting point and good electrical conductivity. Heater 210 can be an arbitrary shape that is wrapped or disposed around pressure vessel 205. Heater 210 is connected to a power supply that provides the electrical current that is necessary to heat heater 210. Heater 210 can be operated at a temperature from 20° C. to 2,000° C. There are a variety of different types of heaters that can be used in high-temperature and high-pressure speed of sound apparatus 200 including a resistance heater or an induction heater. Induction heaters work by generating a magnetic field around pressure vessel 205. The magnetic field causes pressure vessel 205 to heat up. It is contemplated that heater 210 is an oven or furnace. In some embodiments, a cold bath or cooler is used in combination with or in place of an oven or furnace so that including heating zone 211 is cooled instead of heated, wherein the temperature can be regulated from −40° C. to 2000° C.

Heating zone 211 is a portion or length of pressure vessel 205 that is subjected to heat from heater 210 and is a region of the apparatus that is located between acoustic reflector 202 and acoustic rod 206. This zone is characterized by a relatively high temperature and high pressure for accurate measurements of the speed of sound in sample 203. The thermal insulation surrounding pressure vessel 205 can prevent heat from escaping from heating zone 211.

Temperate zone 212 is a portion or length of high-temperature and high-pressure speed of sound apparatus 200 that is not subjected to heat from heater 210 and is a region of the apparatus that is located at a distal terminus of acoustic rod 206 away from defined-length spacer 201. Temperate zone 212 is characterized by a relatively cool temperature relative to heating zone 211 so that ultrasonic transducer 207 is not rendered inoperable due to thermal stress or over temperature. Thermal cooling can be applied to ultrasonic transducer 207 at temperate zone 212.

Gas source 215 provides a controlled amount or flow of pressurization gas 216 to pressure vessel 205. Gas source 215 can include a reservoir of gas, a pressure regulator, and a flow control valve. The reservoir of gas can be either a pressurized tank or a cylinder, and the pressure regulator is used to maintain a constant pressure of gas in the apparatus. The flow control valve is used to control the flow of gas into the apparatus. The pressure of pressurization gas 216 in pressure vessel 205 can be varied from sub-atmosphere to 400 MPa or greater. There are a variety of different types of gas sources available, including pressure tanks, cylinders, gas generators, and the like.

Pressurization gas 216 is a gas that is used to pressurize pressure vessel 205. Pressurization gas 216 can be inert and non-reactive with sample 203. Pressurization gas 216 can be a noble gas (e.g., helium, neon, argon, krypton, or xenon) or other gas such as nitrogen. Pressurization gas 216 can provide a wide range of pressures to sample 203. The pressure of pressurization gas 216 can be controlled by a pressure regulator. The pressure regulator allows the user to set the desired pressure of pressurization gas 216.

Temperature sensor 219 measures the temperature of sample 203 and pressure vessel 205. Temperature sensor 219 is located on heating zone 211 of pressure vessel 205 proximate to sample 203. Temperature sensor 219 is made of a material that is resistant to high temperatures. Temperature sensor 219 has a range of outputs from −200° C. to 2000° C. Temperature sensor 219 can include a variety of materials, including metals (e.g., platinum, nickel, copper, and the like). The material of temperature sensor 219 is chosen based on the operating temperature range and the required accuracy. Temperature sensor 219 can be, e.g., a thermocouple, thermistor, resistance temperature detector (RTD), infrared thermometer, and the like. Thermocouples are made of two different metals that create a voltage when they are in contact with each other. The voltage generated by the thermocouple is proportional to the temperature of sample 203. Other types of temperature sensors that can be used for temperature signal 220 include: Thermistors are made of semiconductor materials that change their resistance with temperature. RTDs are made of metal conductors that change their resistance with temperature. The resistance of the RTD is measured by a Wheatstone bridge circuit, and the output voltage of the bridge circuit is proportional to the temperature of the RTD. Infrared thermometers measure the temperature of an object by measuring the infrared radiation emitted by the object.

Temperature signal 220 is a measurement of the temperature of sample 203. It can be generated by a thermocouple that is in thermal communication with sample 203. The thermocouple converts the temperature of sample 203 into an electrical signal, which is then amplified and displayed on a digital readout or received as an analog signal to an analyzer, e.g., acoustic analyzer 235, for data entry and analysis as well as logging thermodynamic information. Temperature signal 220 can indicate whether sample 203 is at a desired temperature for the measurement of the speed of sound. The speed of sound is a function of temperature so one measures the temperature accurately to obtain accurate measurements of the speed of sound.

Sample 203 is a material that is being tested for its speed of sound at high-temperature and high-pressure. Sample 203 can be any material that is solid or a liquid at the desired test conditions and can be a metal (including alloys), salt, semiconductor (including compound semiconductors). The solid can be a monolithic body, such as an ingot. Sample 203 can a uniform composition and free of defects or impurities. It is contemplated that sample 203 can include impurities or have a gradient in density or material composition. The size of sample 203 can be large enough so that the measurement is not affected by boundaries of sample. Various physical properties of sample 203 can affect the speed of sound in the sample. The density, stiffness, and thermal conductivity of the sample can contribute to the overall speed of sound.

The speed of sound in a sample can be measured by a variety of techniques, including the pulse-echo method, the resonance method, and the ultrasonic interferometry method. The pulse-echo method involves sending a short pulse of sound into the sample and measuring the time it takes for the pulse to return. The resonance method involves exciting the sample at a particular frequency and measuring the resonant frequency. The ultrasonic interferometry method involves sending a continuous wave of sound into the sample and measuring the interference pattern that is produced.

The speed of sound in a sample can be used in a variety of applications, such as nondestructive evaluation, ultrasonic welding, medical imaging, geological analysis, and the like. The speed of sound can be used to determine the thickness of a material, the presence of defects in a material, and the mechanical properties of a material. The speed of sound in a sample can be measured at room temperature and atmospheric pressure. However, the speed of sound can also be measured at high temperatures and high pressures, but conventional techniques are typically limited to only one of the parameters, which high-temperature and high-pressure speed of sound apparatus 200 overcomes and provides measurement of speed of sound 236 simultaneously at high temperatures and high pressures.

Figure 7:
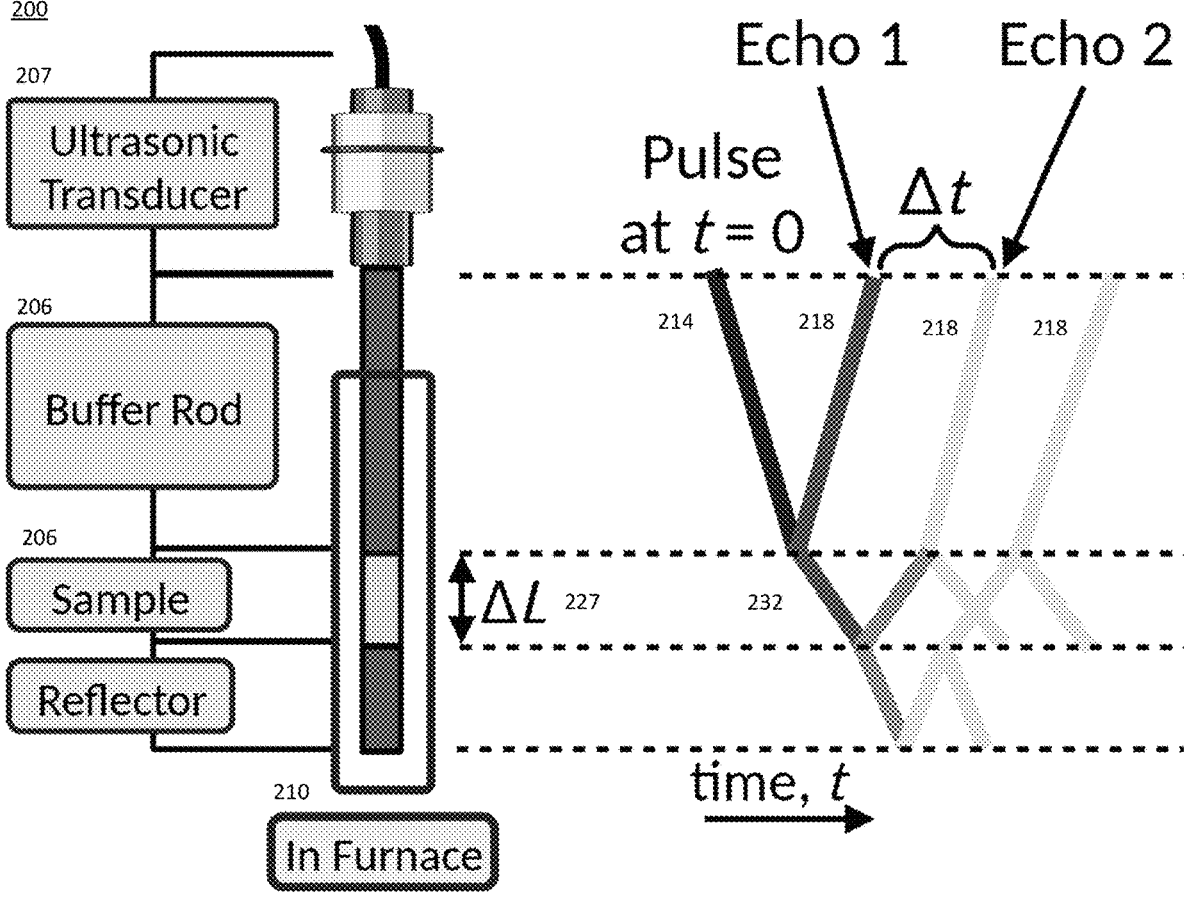
FIG. 7 shows, according to some embodiments, producing sample acoustic pulse and pulse echoes from an excitation acoustic pulse by high-temperature and high-pressure speed of sound apparatus, wherein in the right panel Δt indicates an arrival time of echoes and lighter shades indicate lower signal strength.

In an embodiment, high-temperature and high-pressure speed of sound apparatus 200 includes an ultrasonic transducer, an acoustic rod (a waveguide), a spacer (that provides the acoustic path length through the sample), and an acoustic reflector. With reference to FIG. 7, high-temperature and high-pressure speed of sound apparatus 200 the pulse starts at time, t=0, and then passes through the acoustic rod and sample, reflects off of the reflector, and returns. The speed of sound is given by the transit time of the acoustic pulse through the liquid sample (of length $\Delta L$): w=2$\Delta L$/$\Delta t$. At each stage of the stack, a portion of the sonic pulse is reflected back, and a portion is transmitted, and $\Delta t$ is the time difference between the echo traversing only the acoustic rod and that traveling through both the rod and the sample. A consideration is selecting materials with appropriate acoustic impedance, such that the return signals (echoes) are optimized.

High-temperature and high-pressure speed of sound apparatus 200 can be made in various ways. It should be appreciated that high-temperature and high-pressure speed of sound apparatus 200 includes a number of optical, electrical, or mechanical components, wherein such components can be interconnected and placed in communication (e.g., optical communication, electrical communication, fluid communication, ultrasonic communication, mechanical communication, and the like) by physical, chemical, optical, or free-space interconnects. The components can be disposed on mounts that can be disposed on a bulkhead for alignment or physical compartmentalization. As a result, high-temperature and high-pressure speed of sound apparatus 200 can be disposed in a terrestrial environment or space environment. Elements of high-temperature and high-pressure speed of sound apparatus 200 can be formed from silicon, silicon nitride, and the like although other suitable materials, such ceramic, glass, or metal can be used. According to an embodiment, the elements of high-temperature and high-pressure speed of sound apparatus 200 are formed using 3D printing although the elements of high-temperature and high-pressure speed of sound apparatus 200 can be formed using other methods, such as injection molding or machining a stock material such as block of material that is subjected to removal of material such as by cutting, laser oblation, and the like. Accordingly, high-temperature and high-pressure speed of sound apparatus 200 can be made by additive or subtractive manufacturing.

In an embodiment, a process for making high-temperature and high-pressure speed of sound apparatus 200 includes: providing defined-length spacer 201; disposing defined-length spacer 201 in pressure vessel 205; disposing acoustic reflector 202 on defined-length spacer 201; disposing acoustic rod 206 on defined-length spacer 201; disposing and in crucible 204; and disposing sample 203 in defined-length spacer 201; sealing pressure vessel 205.

High-temperature and high-pressure speed of sound apparatus 200 has numerous advantageous and unexpected benefits and uses. In an embodiment, a process for measuring the speed of sound in a sample at high-temperature and high-pressure with high-temperature and high-pressure speed of sound apparatus 200 includes: providing the high-temperature and high-pressure speed of sound apparatus 200 including: a defined-length spacer 201 that is disposed on a pressure vessel 205 and on which is disposed an acoustic reflector 202, an acoustic rod 206; is disposed in a crucible 204; is in mechanical communication with the acoustic rod 206 and the crucible 204; and comprises a fixed length spacer portion 227I; and receives the acoustic rod 206, and the acoustic reflector 202, such that the crucible 204 is interposed between the defined-length spacer 201 and the pressure vessel 205, and the acoustic rod 206 is fixedly spaced apart from the acoustic reflector 202 by the fixed length spacer portion 227; an acoustic reflector 202 disposed on the pressure vessel 205, the crucible 204, and the defined-length spacer 201 and in mechanical communication with the crucible 204 and the defined-length spacer 201 and in ultrasonic communication with the acoustic rod 206, such that the crucible 204 is interposed between the acoustic reflector 202 and the pressure vessel 205, and the sample 203 is interposed between the acoustic rod 206 and the acoustic reflector 202; the pressure vessel 205 in which is disposed the crucible 204, the disposed defined-length spacer 201, the sample 203, the acoustic reflector 202, the acoustic rod 206 and that receives the crucible 204, the defined-length spacer 201, the sample 203, the acoustic reflector 202, and the acoustic rod 206, and mechanically stabilizes the crucible 204, the defined-length spacer 201, the acoustic reflector 202, the sample 203, and the acoustic rod 206; and the acoustic rod 206 disposed in the pressure vessel 205, the defined-length spacer 201 and on which is disposed an ultrasonic transducer 207 and in ultrasonic communication with the acoustic reflector 202 and the ultrasonic transducer 207, such that the acoustic rod 206 is interposed between the ultrasonic transducer 207 and the ultrasonic transducer 207; receiving the sample 203 in the defined-length spacer 201, such that the sample 203 is interposed between the defined-length spacer 201 and the acoustic reflector 202 in the pressure vessel 205; subjecting the sample 203 to high-pressure and high-temperature in pressure vessel 205; communicating an excitation acoustic pulse 214 from the ultrasonic transducer 207 to the acoustic rod 206; receiving, by the acoustic rod 206, the excitation acoustic pulse 214; communicating the excitation acoustic pulse 214 from the acoustic rod 206 to the sample 203; communicating the excitation acoustic pulse 214 through the sample 203 to the acoustic reflector 202; receiving, by the acoustic reflector 202, the excitation acoustic pulse 214 from the sample 203; reflecting, by the acoustic reflector 202, the excitation acoustic pulse 214 towards the acoustic rod 206 through the sample 203 as pulse echoes 232; repeatedly reflecting, by the acoustic reflector 202 in combination with the acoustic rod 206, the pulse echoes 232 through the sample 203 to form a sample acoustic pulse 218; receiving, by the acoustic rod 206, the pulse echoes 232; converting the pulse echoes 232 to a sample acoustic pulse 218; communicating the sample acoustic pulse 218 to the ultrasonic transducer 207; and determining the speed of sound 236 of the sample 203 from the sample acoustic pulse 218.

In an embodiment, measuring the speed of sound in a sample at high-temperature and high-pressure includes: disposing the acoustic reflector 202 in the pressure vessel 205; disposing the defined-length spacer 201 in the pressure vessel 205; disposing the sample 203 in the defined-length spacer 201; disposing the acoustic rod 206 on the defined-length spacer 201; and disposing the ultrasonic transducer 207 on the acoustic rod 206, prior to subjecting the sample 203 to high-pressure and high-temperature.

In an embodiment, measuring the speed of sound in a sample at high-temperature and high-pressure includes: producing, by the ultrasonic transducer 207, the excitation acoustic pulse 214; receiving, by the ultrasonic transducer 207, the sample acoustic pulse 218 from the acoustic rod 206; and producing, by the ultrasonic transducer 207, an output pulse 234 from the sample acoustic pulse 218.

In an embodiment, measuring the speed of sound in a sample at high-temperature and high-pressure includes: producing an input pulse 233 by a pulser source 213 that is in electrical communication with the ultrasonic transducer 207;

communicating the input pulse 233 to the ultrasonic transducer 207 from the pulser source 213; and controlling, by the input pulse 233, production of the excitation acoustic pulse 214 by the ultrasonic transducer 207.

In an embodiment, measuring the speed of sound in a sample at high-temperature and high-pressure includes: providing, by a gas source 215 in fluid communication with the pressure vessel 205, a pressurization gas 216 to the pressure vessel 205; and pressurizing the pressure vessel 205 with the pressurization gas 216.

In an embodiment, measuring the speed of sound in a sample at high-temperature and high-pressure includes: monitoring, by a temperature sensor 219 disposed on the pressure vessel 205 and in thermal communication with the pressure vessel 205, the temperature of the sample 203 in a heating zone 211; and producing the temperature signal 220 that indicates the temperature of the sample 203 in the defined-length spacer 201.

In an embodiment, measuring the speed of sound in a sample at high-temperature and high-pressure includes: receiving, by an acoustic analyzer 235 in electrical communication with the ultrasonic transducer 207, an output pulse 234 from the ultrasonic transducer 207; analyzing the output pulse 234; and producing the speed of sound 236 of the sample 203 form analyzing the output pulse 234.

In an embodiment, measuring the speed of sound in a sample at high-temperature and high-pressure includes: defining the spacer's length ($\Delta L$); assembling the acoustic stack; sealing the acoustic stack within a pressure vessel; heating and/or pressurizing to desired operating conditions; transmitting, by the ultrasonic transducer a pulse through the acoustic rod; measuring the pulse reflection at the interface between the acoustic rod and sample as an echo (echo A); measuring the pulse reflection at the interface between the sample and reflector as an echo (echo B); defining the time between echo A and echo B as the time taken for the pulse to traverse the sample ($\Delta t$); calculating sound speed as given the defined length of the spacer and the time between echoes ($2\Delta L/\Delta t$).

Figure 6:
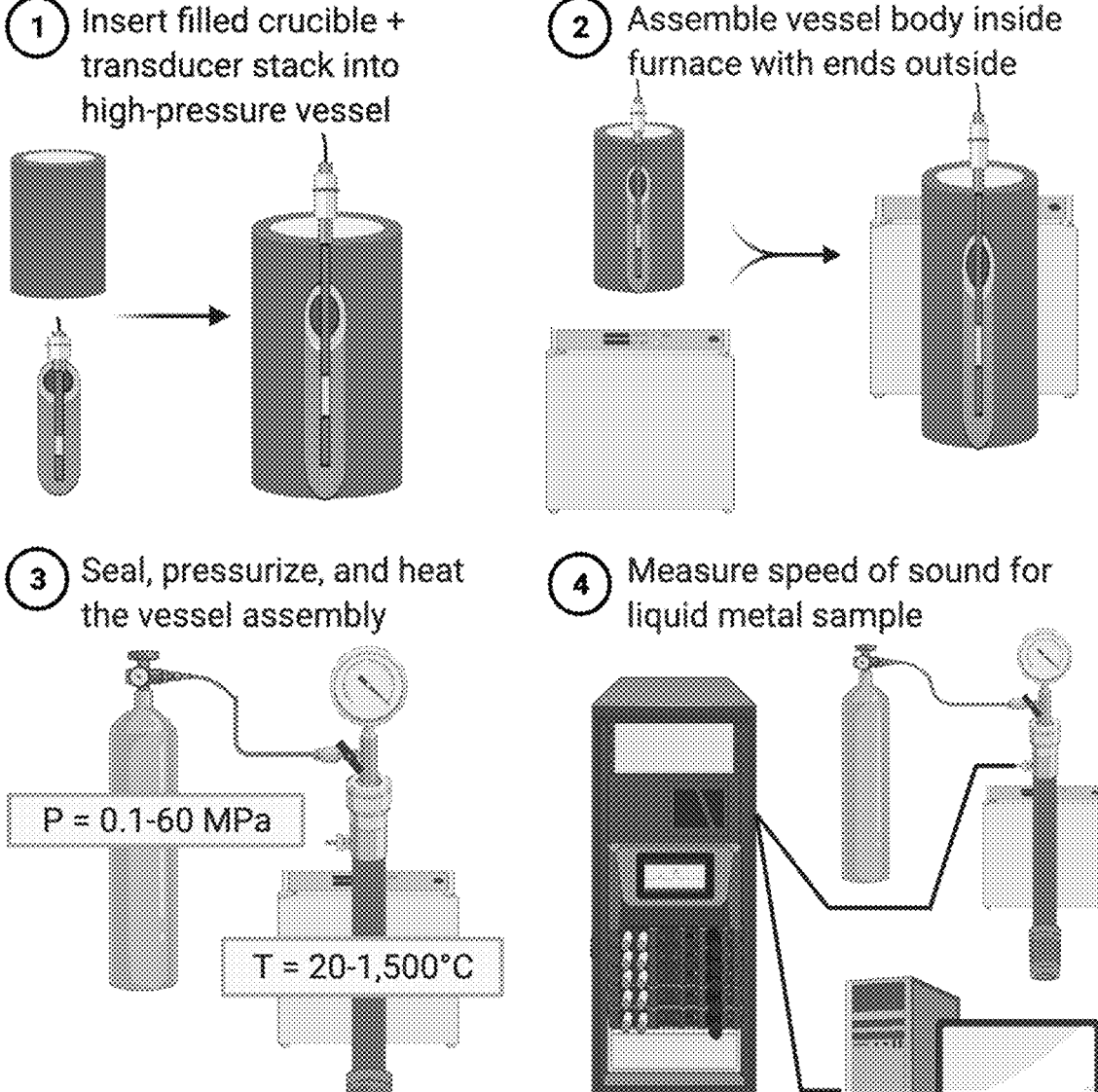
FIG. 6 shows, according to some embodiments, measuring the speed of sound in a sample at high-temperature and high-pressure.

In an embodiment, with reference to FIG. 6, a process for measuring the speed of sound in a sample at high-temperature and high-pressure the acoustic stack is disposed in a high-pressure vessel. The assembly of the sound speed instrument occurs by placing the transducer stack inside an empty crucible. Then the inside of the spacer and volume between the acoustic stack and crucible will be filled with additional sample, if desired, and placed in a pressure vessel. Second, the pressure vessel assembly can be positioned in a furnace. The furnace surrounds the vessel, while the ends of the vessel will be positioned outside of the furnace. Both ends or a single end of the vessel can be arranged outside of the furnace. High-temperature and high-pressure speed of sound apparatus 200 can have pressure vessel ends that are outside of the furnace, which can allow for using commercially available components, including the ultrasonic transducer. The vessel is sealed, pressurized, and heated. Operations can be conducted over a range of measurement conditions from $1*10^{-7}$ MPa to 400 MPa, and temperatures from $-40°$ C. to $2000°$ C. over which data are acquired for the speed of sound.

In some embodiments, high-temperature and high-pressure speed of sound apparatus 200 arranges the pressure vessel ends outside the furnace hot zone and prevents damage to ultrasonic transducer. A different acoustic rod, spacer, reflector, and crucible can be used per sample to prevent cross-contamination and ensure measurement reproducibility and validity. A solid cylindrical sample can be used instead of powder shot to prevent surface area oxidation. Removing oxygen and pressurizing with a gas, e.g., argon, can conserve material purity.

High-temperature and high-pressure speed of sound apparatus 200 solves the problem of the absence of a conventional instrument that measures thermodynamic material property data for liquid phase materials with a melting point above $200°$ C. and pressures above atmospheric pressure. This problem leads to a gap in reference data that limits efforts such as novel material discovery and manufacturing optimization.

The speed of sound of liquid materials with a melting point above $200°$ C. is not commonly measured. SoS is used in key industrial applications such as understanding atomization in the making of fine metal powders in additive manufacturing (AM). Atomization has become a primary method in AM to produce fine metal powders used in Direct Laser Deposition (DLD) and Powder Bed Fusion-Laser (PBF-L) techniques. Computational models seeking to optimize the metal atomization process are constrained to using less accurate SoS liquid metal material property methods such as derivative or constant values in a dynamic environment. High-temperature and high-pressure speed of sound apparatus 200 can provide SoS reference data that can be used in atomization computational simulations.

Direct SoS measurements with high-temperature and high-pressure speed of sound apparatus 200 provide high accuracy over a wide temperature and pressure range whereas conventional direct measurements, such as density, have limited accuracy. High-temperature and high-pressure speed of sound apparatus 200 can be used in automated operation.

In using speed of sound measurements combined with density and isobaric heat capacity data at a single (T, p) point, one can accurately derive additional thermophysical properties of density, isobaric expansivity, and isobaric heat capacity at an arbitrary temperature, T, and pressure, p. Thus, accurate SoS measurements can be used to obtain three additional properties. Accurate SoS measurements are useful in modeling a material's thermodynamic properties by use of an Equation of State (EoS). Having data-driven advanced manufacturing models for industries that use liquid (molten) metals or salts is highly valuable. Additive manufacturing (3D printing), nuclear (molten salt reactors), and semiconductor (EUV lithography process) industries are in need of such data.

It should be appreciated that the speed of sound is a property used in density $\rho$, isobaric heat capacity $c_p$, and isobaric expansivity $\alpha$. From a metrology perspective, high-temperature and high-pressure speed of sound apparatus 200 determines the speed of sound rapidly and automatically across wide range of temperatures and pressures with low uncertainty.

In an embodiment, high-temperature and high-pressure speed of sound apparatus 200 and measuring the speed of sound in a sample at high-temperature and high-pressure can include the properties, functionality, hardware, and process steps described herein and embodied in any of the following non-exhaustive list:

a process (e.g., a computer-implemented method including various steps; or a method carried out by a computer including various steps);

an apparatus, device, or system (e.g., a data processing apparatus, device, or system including means for carrying out such various steps of the process; a data processing apparatus, device, or system including means for carrying out various steps; a data processing apparatus, device, or system including a processor adapted to or configured to perform such various steps of the process);

a computer program product (e.g., a computer program product including instructions which, when the program is executed by a computer, cause the computer to carry out such various steps of the process; a computer program product including instructions which, when the program is executed by a computer, cause the computer to carry out various steps);

a computer-readable storage medium or data carrier (e.g., a computer-readable storage medium including instructions which, when executed by a computer, cause the computer to carry out such various steps of the process; a computer-readable storage medium including instructions which, when executed by a computer, cause the computer to carry out various steps; a computer-readable data carrier having stored thereon the computer program product; a data carrier signal carrying the computer program product); a computer program product including comprising instructions which, when the program is executed by a first computer, cause the first computer to encode data by performing certain steps and to transmit the encoded data to a second computer; or a computer program product including instructions which, when the program is executed by a second computer, cause the second computer to receive encoded data from a first computer and decode the received data by performing certain steps.

Figure 9:
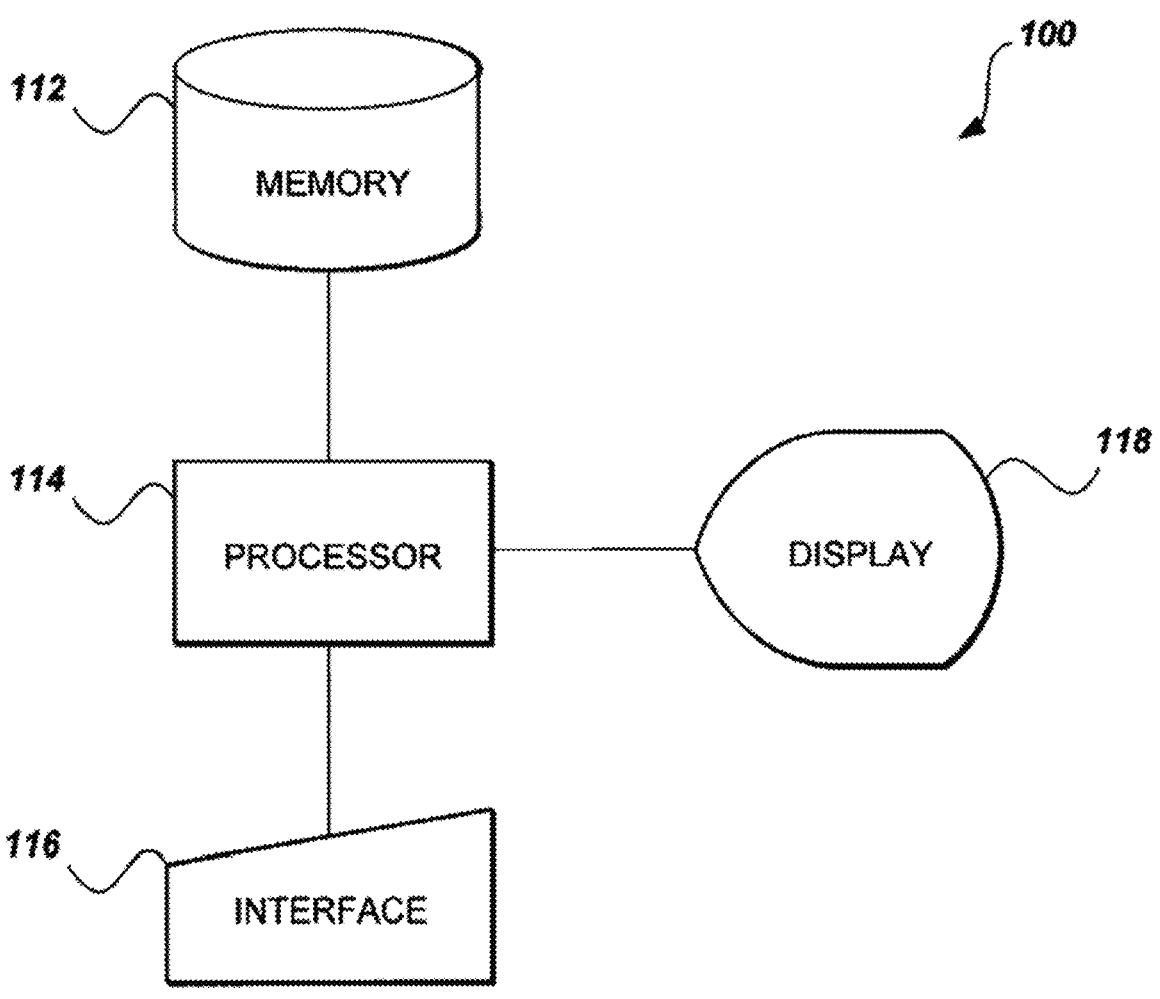
FIG. 9 shows, according to some embodiments, a computing system for performing calculations and analysis of data from a high-temperature and high-pressure speed of sound apparatus for determination of the sound of speed.

It should be understood that calculations can be performed by any suitable computer system, such as that diagrammatically shown in FIG. 9. Data is entered into system 100 via any suitable type of user interface 116, and may be stored in memory 112, which may be any suitable type of computer readable and programmable memory and is preferably a non-transitory, computer readable storage medium. Calculations are performed by processor 114, which may be any suitable type of computer processor and may be displayed to the user on display 118, which may be any suitable type of computer display.

Processor 114 may be associated with, or incorporated into, any suitable type of computing device, for example, a personal computer or a programmable logic controller. The display 118, the processor 114, the memory 112 and any associated computer readable recording media are in communication with one another by any suitable type of data bus, as is well known in the art.

Examples of computer-readable recording media include non-transitory storage media, a magnetic recording apparatus, an optical disk, a magneto-optical disk, and/or a semiconductor memory (for example, RAM, ROM, etc.). Examples of magnetic recording apparatus that may be used in addition to memory 112, or in place of memory 112, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. It should be understood that non-transitory computer-readable media include all computer-readable media except for a transitory, propagating signal.

High-temperature and high-pressure speed of sound apparatus 200 is a device that can measure the speed of sound in a fluid at high temperatures and pressures. This information is useful for a variety of applications, such as the design of engines and other high-performance devices. High-temperature and high-pressure speed of sound apparatus 200 has a number of advantages over other methods of measuring the speed of sound including measuring the speed of sound at under both high temperatures and pressures, which is not possible with conventional technology. The sound speed instrument can be used for analysis of liquid metal or salt samples, which enables the creation of standard reference data and in turn, data-driven advanced manufacturing models for industries that use liquid (molten) metals or salts. Industries that could immediately benefit include the additive manufacturing (3D printing), nuclear (molten salt reactors), and semiconductor (EUV lithography process) industries. The sound speed instrument and process for measuring the sound speed of a sample at elevated temperatures and pressures enable rapid, automated, and accurate measuring of a material's liquid phase speed of sound at elevated temperature and pressures.

There are no commercial instruments to-date able to measure the speed of sound at pressures above atmospheric conditions and above temperatures of 500° C. High-temperature and high-pressure speed of sound apparatus 200 fills the gap and allows for measurements from $1*10^{-7}$ MPa to 400 MPa, and temperatures from −40 to 2000° C. Additionally, High-temperature and high-pressure speed of sound apparatus 200 is superior to current practice in that data collection can be accomplished rapidly, automatically, and at an estimated level of uncertainty of about 0.1%.

The processes described herein can be embodied in, and fully automated via, software code modules executed by a computing system that includes one or more general purpose computers or processors. The code modules can be stored in any type of non-transitory computer-readable medium or other computer storage device. Some or all the methods may alternatively be embodied in specialized computer hardware. In addition, the components referred to herein can be implemented in hardware, software, firmware, or a combination thereof.

Many other variations than those described herein can be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

Any logical blocks, modules, and algorithm elements described or used in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described or used in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein can be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

While one or more embodiments have been shown and described, modifications and substitutions can be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Option, optional, or optionally means that the subsequently described event or circumstance can or cannot occur, and that the description includes instances where the event occurs and instances where it does not. As used herein, combination is inclusive of blends, mixtures, alloys, reaction products, collection of elements, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms "a," "an," and "the" and similar referents in the context of describing the invention (especially in the context of the following claims) are to be construed to cover both the singular and the plural, unless otherwise indicated herein or clearly contradicted by context. It can further be noted that the terms first, second, primary, secondary, and the like herein do not denote any order, quantity, or importance, but rather are used to distinguish one element from another. It can also be understood that, although the terms first, second, etc. are, in some instances, used herein to describe various elements, these elements should not be limited by these terms. For example, a first current could be termed a second current, and, similarly, a second current could be termed a first current, without departing from the scope of the various described embodiments. The first current and the second current are both currents, but they are not the same condition unless explicitly stated as such.

The modifier about used in connection with a quantity is inclusive of the stated value and has the meaning dictated by the context (e.g., it includes the degree of error associated with measurement of the particular quantity). The conjunction or is used to link objects of a list or alternatives and is not disjunctive; rather the elements can be used separately or can be combined together under appropriate circumstances.

What is claimed is:

1. A high-temperature and high-pressure speed of sound apparatus for measuring the speed of sound in a sample at high-temperature and high-pressure, the high-temperature and high-pressure speed of sound apparatus comprising: a pressure vessel containing a crucible, wherein the crucible contains a defined-length spacer disposed in the crucible in the pressure vessel and on which is disposed an acoustic reflector and an acoustic rod that is axially in mechanical communication with the acoustic rod and radially in mechanical communication with the crucible and the defined-length spacer comprises a central fixed length spacer portion and that receives the sample, and the defined-length spacer axially receives the acoustic rod on one end and axially receives the acoustic reflector on the opposing end, wherein the crucible is radially interposed between the defined-length spacer and the pressure vessel, the acoustic rod is fixedly spaced apart from the acoustic reflector by the fixed length spacer portion, and the sample is axially interposed between the defined-length spacer and the acoustic reflector; the acoustic reflector disposed on the interior bottom of the crucible, and the defined-length spacer and in mechanical communication with the crucible and the defined-length spacer and in ultrasonic communication with the acoustic rod, wherein the acoustic reflector receives an excitation acoustic pulse from the acoustic rod via the sample, reflects the excitation acoustic pulse toward the acoustic rod as pulse echoes, and in combination with the acoustic rod repeatedly reflects the pulse echoes through the sample to form a sample acoustic pulse, wherein the crucible is interposed radially between the acoustic reflector and the pressure vessel, and the sample is interposed axially between the acoustic rod and the acoustic reflector; the pressure vessel in which is disposed the crucible, the defined-length spacer, the sample, the acoustic reflector, and the acoustic rod and that receives the crucible, the defined-length spacer, the sample, the acoustic reflector, and the acoustic rod, mechanically stabilizes the crucible, the defined-length spacer, the acoustic reflector, the sample, and the acoustic rod, and provides high-pressure and high-temperature conditions for the sample during determination of the speed of sound in the sample; and wherein the acoustic rod disposed in the pressure vessel, the defined-length spacer and on which is disposed an ultrasonic transducer and in ultrasonic communication with the acoustic reflector and the ultrasonic transducer and that receives the excitation acoustic pulse from the ultrasonic transducer, communicates the excitation acoustic pulse to the acoustic reflector via the sample, receives the pulse echoes from the acoustic rod via the sample, in combination with the acoustic rod repeatedly reflects the pulse echoes through the sample, converts the pulse echoes to the sample acoustic pulse, and communicates the sample acoustic pulse to the ultrasonic transducer, wherein the acoustic rod is axially interposed between the ultrasonic transducer and the defined length spacer.

2. The high-temperature and high-pressure speed of sound apparatus of claim 1, further comprising the sample disposed in the defined-length spacer and that is interposed between the acoustic rod and the acoustic reflector and that communicates the excitation acoustic pulse and the pulse echoes between the acoustic rod and the acoustic reflector, such that the sample is arranged within a heating zone of the defined-length spacer, and the sample is subjected to heating to the high-temperature and pressurization to the high-pressure.

3. The high-temperature and high-pressure speed of sound apparatus of claim 1, further comprising the crucible disposed in the pressure vessel and on which is disposed the defined-length spacer and that receives the defined-length spacer, the acoustic reflector, the sample, and the acoustic rod, mechanically stabilizes the defined-length spacer, the acoustic reflector, the sample, and the acoustic rod within the pressure vessel, and provides thermal communication from the pressure vessel to the sample.

4. The high-temperature and high-pressure speed of sound apparatus of claim 1, further comprising an ultrasonic transducer disposed on the acoustic rod and in ultrasonic communication with the acoustic rod and in ultrasonic communication with the sample and that produces the excitation acoustic pulse, communicates the excitation acoustic pulse to the acoustic rod, receives the sample acoustic pulse from the acoustic rod, and produces an output pulse from the sample acoustic pulse.

5. The high-temperature and high-pressure speed of sound apparatus of claim 1, further comprising a vessel cap disposed on the pressure vessel and in mechanical communication with the pressure vessel and that provides a leak-proof seal in combination with the pressure vessel so that gases and liquids are maintained in the pressure vessel.

6. The high-temperature and high-pressure speed of sound apparatus of claim 1, further comprising: a seal connection disposed on the pressure vessel connector and in mechanical communication with a pressure vessel connector and in mechanical communication with a seal and that mechanically engages the pressure vessel connector and the seal, produces a compressive force in combination with the pressure vessel connector, communicates the compressive force to the seal, and forms a leak-proof seal between the pressure vessel connector and the acoustic rod with the seal that maintains the high-pressure of a pressurization gas in the pressure vessel under high-temperature conditions; and the pressure vessel connector disposed on the seal connection and in mechanical communication with the seal connection and that mechanically engages the seal connection and seals the pressure vessel in combination with the pressure vessel connector.

7. The high-temperature and high-pressure speed of sound apparatus of claim 6, further comprising the seal disposed on the pressure vessel connector, the seal connection, the acoustic rod and in mechanical communication with the pressure vessel connector, the seal connection, and the acoustic rod and that seats in the pressure vessel connector, receives the compressive force from the pressure vessel connector and the seal connection, mechanically engages the acoustic rod in response to the compressive force, and forms the leak-proof seal between the pressure vessel connector and the acoustic rod that maintains the high-pressure of the pressurization gas in the pressure vessel under high-temperature conditions.

8. The high-temperature and high-pressure speed of sound apparatus of claim 1, further comprising a heater in thermal communication with the pressure vessel, the heating zone, and the sample and that produces heat that is communicated to the sample in the heating zone via the pressure vessel that heats the sample.

9. The high-temperature and high-pressure speed of sound apparatus of claim 1, further comprising a pulser source in electrical communication with the ultrasonic transducer and that produces an input pulse, communicates the input pulse to the ultrasonic transducer, and controls production of the excitation acoustic pulse by the ultrasonic transducer by the input pulse.

10. The high-temperature and high-pressure speed of sound apparatus of claim 9, further comprising: a heating zone arranged along the pressure vessel where the sample is received by the defined-length spacer, receives heat from the heater and communicates the heat to sample; a temperate zone arranged along the acoustic rod and the ultrasonic transducer outside of the heating zone so that the ultrasonic transducer is not subjected to the high-temperature and avoids thermal malfunction of the ultrasonic transducer.

11. The high-temperature and high-pressure speed of sound apparatus of claim 1, further comprising a gas source in fluid communication with the pressure vessel and that provides a pressurization gas to the pressure vessel and pressurizes the pressure vessel with pressurization gas.

12. The high-temperature and high-pressure speed of sound apparatus of claim 1, further comprising a temperature sensor disposed on the pressure vessel and in thermal communication with the pressure vessel and that monitors the temperature of the sample in a heating zone and produces the temperature signal that indicates the temperature of the sample in the defined-length spacer.

13. The high-temperature and high-pressure speed of sound apparatus of claim 1, wherein the defined-length spacer comprises: an acoustic reflector receiver disposed in the crucible and that comprises an acoustic reflector receiver wall and an acoustic reflector receiver step and that receives the acoustic reflector, such that the acoustic reflector is disposed on the acoustic reflector receiver step; the acoustic reflector receiver step disposed on the crucible and in mechanical communication with the crucible and that opposes the crucible and mechanically engages a reflector contact surface of the acoustic reflector, such that a crucible contact surface of the acoustic reflector mechanically engages the crucible, and the acoustic reflector is interposed between the acoustic reflector receiver step and the crucible; the acoustic reflector receiver wall that provides an interior boundary of the defined-length spacer for receipt of the acoustic reflector in the acoustic reflector receiver; a sample receiver that comprises a sample receiver wall and an effluent aperture and receives the sample, such that the sample is disposed on the reflector contact surface of the acoustic reflector; the sample receiver wall that provides an interior boundary of the defined-length spacer for receipt of the sample in the sample receiver; the effluent aperture in fluid communication with the sample and the sample receiver wall and that communicates a pressurization gas between the pressure vessel and the sample in the defined-length spacer, communicates off-gas from the sample to the pressure vessel, and provides flow communication for evacuation and pressurization of the defined-length spacer at the same pressure as the internal volume of the pressure vessel external to the defined-length spacer; the fixed length spacer portion that fixes the distance between the acoustic rod receiver step of the acoustic rod receiver and the acoustic reflector receiver step of the acoustic reflector receiver over which the excitation acoustic pulse is communicated through the sample from the acoustic rod to the acoustic reflector and over which the pulse echoes are repeatedly reflected between the acoustic rod and the acoustic reflector; an acoustic rod receiver step that opposes the ultrasonic transducer and mechanically engages a sample contact surface of the acoustic rod, such that the acoustic rod is interposed between the ultrasonic transducer and the acoustic rod receiver step, and the sample contact surface of the acoustic rod is fixedly spaced apart from the reflector contact surface of the acoustic reflector by the fixed length spacer portion; an acoustic rod receiver wall that provides an interior boundary of an acoustic rod receiver of the defined-length spacer for receipt of the acoustic rod in the acoustic rod receiver; and the acoustic rod receiver that comprises the acoustic rod receiver step and the acoustic rod receiver wall and receives the acoustic rod, such that the acoustic rod is disposed on the acoustic rod receiver step of the acoustic rod receiver.

14. The high-temperature and high-pressure speed of sound apparatus of claim 1, further comprising an acoustic analyzer in electrical communication with the ultrasonic transducer and that receives an output pulse from the ultrasonic transducer, analyzes the output pulse, and produces the speed of sound of the sample.

15. A process for measuring the speed of sound in a sample at high-temperature and high-pressure using a high-temperature and high-pressure speed of sound apparatus, the process comprising: providing the high-temperature and high-pressure speed of sound apparatus comprising: a pressure vessel containing a crucible, wherein the crucible contains a defined-length spacer that is disposed on the pressure vessel and on which is disposed an acoustic reflector, an acoustic rod; is disposed in the crucible; is axially in mechanical communication with the acoustic rod and radially in mechanical communication with the crucible; and comprises a central fixed length spacer portion; and axially receives the acoustic rod on one end and axially receives the acoustic reflector on the opposing end, wherein the crucible is radially interposed between the defined-length spacer and the pressure vessel, and the acoustic rod is fixedly spaced apart from the acoustic reflector by the fixed length spacer portion; an acoustic reflector disposed on the interior bottom of the crucible, and the defined-length spacer and in mechanical communication with the crucible and the defined-length spacer and in ultrasonic communication with the acoustic rod, wherein the crucible is interposed radially between the acoustic reflector and the pressure vessel, and the sample is interposed axially between the acoustic rod and the acoustic reflector; the pressure vessel in which is disposed the crucible, the disposed defined-length spacer, the sample, the acoustic reflector, the acoustic rod and that receives the crucible, the defined-length spacer, the sample, the acoustic reflector, and the acoustic rod, and mechanically stabilizes the crucible, the defined-length spacer, the acoustic reflector, the sample, and the acoustic rod; and wherein the acoustic rod disposed in the pressure vessel, the defined-length spacer and on which is disposed an ultrasonic transducer and in ultrasonic communication with the acoustic reflector and the ultrasonic transducer, wherein the acoustic rod is axially interposed between the ultrasonic transducer and the defined length spacer; receiving the sample in the defined-length spacer, such that the sample is axially interposed between the defined-length spacer and the acoustic reflector in the pressure vessel; subjecting the sample to high-pressure and high-temperature in pressure vessel; communicating an excitation acoustic pulse from the ultrasonic transducer to the acoustic rod; receiving, by the acoustic rod, the excitation acoustic pulse; communicating the excitation acoustic pulse from the acoustic rod to the sample; communicating the excitation acoustic pulse through the sample to the acoustic reflector; receiving, by the acoustic reflector, the excitation acoustic pulse from the sample; reflecting, by the acoustic reflector, the excitation acoustic pulse towards the acoustic rod through the sample as pulse echoes; repeatedly reflecting, by the acoustic reflector in combination with the acoustic rod, the pulse echoes through the sample to form a sample acoustic pulse; receiving, by the acoustic rod, the pulse echoes; converting the pulse echoes to a sample acoustic pulse; communicating the sample acoustic pulse to the ultrasonic transducer; and determining the speed of sound of the sample from the sample acoustic pulse.

16. The process of claim 15, further comprising: disposing the acoustic reflector in the pressure vessel; disposing the defined-length spacer in the pressure vessel; disposing the sample in the defined-length spacer; disposing the acoustic rod on the defined-length spacer; and disposing the ultrasonic transducer on the acoustic rod, prior to subjecting the sample to high-pressure and high-temperature.

17. The process of claim 15, further comprising: producing, by the ultrasonic transducer, the excitation acoustic pulse; receiving, by the ultrasonic transducer, the sample acoustic pulse from the acoustic rod; and producing, by the ultrasonic transducer, an output pulse from the sample acoustic pulse.

18. The process of claim 17, further comprising: producing an input pulse by a pulser source that is in electrical communication with the ultrasonic transducer; communicating the input pulse to the ultrasonic transducer from the pulser source; and controlling, by the input pulse, production of the excitation acoustic pulse by the ultrasonic transducer.

19. The process of claim 15, further comprising providing, by a gas source in fluid communication with the pressure vessel, a pressurization gas to the pressure vessel; and pressurizing the pressure vessel with the pressurization gas.

20. The process of claim 15, further comprising monitoring, by a temperature sensor disposed on the pressure vessel and in thermal communication with the pressure vessel, the temperature of the sample in a heating zone; and producing the temperature signal that indicates the temperature of the sample in the defined-length spacer.

21. The process of claim 15, further comprising receiving, by an acoustic analyzer in electrical communication with the ultrasonic transducer, an output pulse from the ultrasonic transducer; analyzing the output pulse; and producing the speed of sound of the sample form analyzing the output pulse.

* * * * *